US007588066B2

(12) United States Patent
Parker et al.

(10) Patent No.: US 7,588,066 B2
(45) Date of Patent: Sep. 15, 2009

(54) BINDER STRIP CASSETTE

(75) Inventors: Kevin P. Parker, Berkeley, CA (US); Jerome D. Olson, Oakland, CA (US)

(73) Assignee: Powis Parker Inc., Berkeley, CA (US)

( * ) Notice: Subject to any disclaimer, the term of this patent is extended or adjusted under 35 U.S.C. 154(b) by 597 days.

(21) Appl. No.: 11/389,523

(22) Filed: Mar. 24, 2006

(65) Prior Publication Data

US 2006/0266872 A1 Nov. 30, 2006

Related U.S. Application Data

(63) Continuation-in-part of application No. 10/800,951, filed on Mar. 15, 2004, now Pat. No. 7,281,559.

(51) Int. Cl.
*B32B 38/10* (2006.01)
*B32B 3/06* (2006.01)
*B32B 3/16* (2006.01)

(52) U.S. Cl. ....................... 156/584; 156/249; 156/344; 156/541; 412/6; 412/8; 412/34; 428/100; 428/132; 428/138; 428/139; 428/343; 221/73

(58) Field of Classification Search ................. 156/247, 156/249, 344, 541, 584; 412/6, 8, 34, 37; 428/99, 100, 132, 138, 139, 343; 221/70, 221/72, 73

See application file for complete search history.

(56) References Cited

U.S. PATENT DOCUMENTS 2,204,098 A * 6/1940 Ainsworth ................... 40/534
2,294,347 A 8/1942 Bauer .......................... 154/46
3,816,866 A 6/1974 Miaskoff et al. ................. 11/3
3,847,718 A 11/1974 Watson ........................ 161/39
3,912,304 A 10/1975 Abildgaard et al. ........ 281/21.1
RE29,105 E 1/1977 Miaskoff et al. ................. 11/3
4,299,410 A 11/1981 Jukola ...................... 281/21 R
4,377,430 A 3/1983 Bexley et al. ............... 156/184
4,420,282 A 12/1983 Axelrod ......................... 412/4
4,496,617 A 1/1985 Parker ......................... 428/55

(Continued)

FOREIGN PATENT DOCUMENTS

WO WO 2005/065960 A1 12/2004

OTHER PUBLICATIONS

Planax® "Thermo Binding Strips" manufactured by Planatol Klebetechnik GmbH, Rohrdorf-Thansau, Germany. (Admitted Prior Art).

*Primary Examiner*—Mark A Osele
(74) *Attorney, Agent, or Firm*—Girard & Equitz LLP

(57) ABSTRACT

A binder strip cassette including a binder strip roll disposed within a cassette housing, with the roll including a multiplicity of elongated binder strips, each of said binder strips including a flexible substrate and an adhesive disposed on the substrate. The cassette is further provided with a drive apparatus for unwinding the binder strip roll to provide an unwound portion of the binder strip roll together with a separating apparatus disposed within the cassette housing for separating the binder strips from the elongated carrier of the unwound portion of the binder strip roll to produce a separated binder strip. The unwinding by the drive apparatus causes the separated binder strip to be at least partially ejected through a binder strip eject opening in the cassette housing.

14 Claims, 27 Drawing Sheets

U.S. PATENT DOCUMENTS 4,537,544 A 8/1985 Joost ........................ 412/5
4,762,341 A 8/1988 Rabuse ........................ 281/29
4,800,110 A 1/1989 DuCorday ................... 428/43
4,906,156 A 3/1990 Axelrod ..................... 412/21
4,954,385 A * 9/1990 Samann ..................... 428/131
5,052,872 A 10/1991 Hunder et al. ................. 412/6
5,078,563 A 1/1992 Lolli ........................ 412/8
5,154,447 A 10/1992 Tooker ...................... 281/21.1
5,340,155 A 8/1994 Podosek ..................... 281/29
5,351,426 A 10/1994 Voy et al. ..................... 40/638
5,364,215 A 11/1994 Snellman et al. ............... 412/3
5,587,222 A * 12/1996 Hoffmann ................... 428/192
5,601,312 A 2/1997 Funkhouser ............... 281/21.1
5,605,425 A 2/1997 Schaefer ...................... 412/4
5,727,816 A 3/1998 Ong ........................ 281/29
5,779,423 A 7/1998 Bermingham .................. 412/4
5,863,384 A 1/1999 Reddy ...................... 156/576
5,988,252 A 11/1999 Carroll ..................... 156/540
6,010,157 A 1/2000 Pierson et al. ............. 281/21.1
6,102,098 A 8/2000 Randazzo .................. 156/577
6,158,776 A 12/2000 Purcocks .................. 281/21.1
6,174,120 B1 1/2001 Kalisher ....................... 412/1
6,322,867 B1 11/2001 Rush et al. ................. 428/40.1
6,332,630 B1 12/2001 Wolff et al. ................... 281/29
6,413,604 B1 * 7/2002 Matthews et al. .......... 428/40.1
6,599,074 B2 7/2003 Parker ........................ 412/33
6,685,415 B2 2/2004 Rush et al. .................... 412/37
6,709,727 B1 3/2004 Parker ...................... 428/40.1
7,134,822 B2 11/2006 Parker et al. .................. 412/19
2004/0066030 A1 4/2004 Parker
2004/0120793 A1 6/2004 Parker
2004/0120794 A1 6/2004 Parker
2005/0064147 A1 3/2005 Rublowsky et al.
2005/0173856 A1 8/2005 Parker et al.
2005/0199348 A1 9/2005 Parker et al.

* cited by examiner

| CONDITION | SENSOR A | SENSOR B | REMARKS |
|---|---|---|---|
| EVERY STRIP STOP POSITION | ON | OFF | |
| STRIP FEEDING | OFF | OFF | |
| NEAR END POSITION | ON | ON | LAST FOUR STRIPS |
| LAST STRIP AND END | OFF | ON | |

BINDER STRIP CASSETTE

CROSS-REFERENCE TO RELATED APPLICATIONS

The present application is a Continuation-In-Part of application Ser. No. 10/800,951 filed on Mar. 15, 2004 now U.S. Pat. No.7,281,559.

BACKGROUND OF THE INVENTION

1. Field of the Invention

The present invention relates generally to the field of bookbinding and, in particular, to container for dispensing adhesive binder strips.

2. Description of the Related Art

Binder strips having a paper substrate covered with a heat activated adhesive layer have become increasing popular for use in bookbinding. This method of bookbinding has become a low cost alternative to commercial bookbinding. An exemplary binder strip is disclosed in U.S. Pat. No. 4,496,617, the contents of which are incorporated herein by reference. An exemplary desktop binding machine for binding books using the binder strips is disclosed in U.S. Pat. No. 5,052,873, the contents of which are also incorporated herewith by reference. Referring to the drawings, FIG. 1 shows a binder strip 20 disposed adjacent the insertion point 30A of a conventional binding machine 30. A user first places a stack of sheets 32 to be bound in an upper opening of the machine. Controls 30B are then activated to commence the binding process. The binding machine operates to sense the thickness of the stack 32 and indicates on a machine display 30C the width of binder strip 20 to be used. Typically, three widths can be used, including wide, medium and narrow. The binder strip includes a flexible substrate 20A having a length that corresponds to the length of the edge of the stack 32 to be bound and a width somewhat greater than the thickness of the stack. A layer of heat-activated adhesive is disposed on one side of the substrate, including a low viscosity, low tack central adhesive band 20C and a pair of high viscosity, high tack outer adhesive bands 20B.

Once the user has selected a binder strip 20 of appropriate width, the user manually inserts the strip 20 into the strip loading port 30A of the machine. The end of the strip, which is positioned with the adhesive side up, is sensed by the machine and is drawing into the machine using an internal strip handling mechanism. The machine then operates to apply the strip to the edge of the stack to be bound. The strip is essentially folded around the edge of the stack, with heat and pressure being applied so as to activate the adhesive. Once the adhesive has cooled to some extent, the bound book is removed from the binding machine so that additional books can be bound.

FIG. 2 depicts a partial end view of the bound stack 32. As can be seen, the binder strip substrate 20A is folded around the bound edge of the stack. The high tack, high viscosity outer adhesive bands 20B function to secure the strip to the front and back sheets of the stack. These sheets, which function as the front and rear covers, can be made of heavy paper or the like. The central low viscosity adhesive band 20C functions to secure the individual sheets of the stack by flowing up slightly between the sheets during the binding process.

Although manual feeding of the binder strip permits books to be bound at a fairly high rate, there is a need for an apparatus that can feed binder strips to binding machines at a higher rate. Such apparatus preferably could be used with a wide variety of binder machines and binder strips. Further, such apparatus would preferably be capable of storing a relatively large number of binder strips and be capable of fabrication using materials that are recyclable. As will be apparent from a reading of the following Detailed Description of the Invention together with the drawings, the present invention provides the above-described features.

SUMMARY OF THE INVENTION

A binder strip cassette comprising a roll of binder strips rotatably mounted within a cassette housing is disclosed. The roll includes a multiplicity of elongated binder strips, with each of the binder strips including a flexible substrate and an adhesive disposed on the substrate. The roll further includes a flexible elongated carrier supporting the binder strips, with the binder strips being disposed along a length of the elongated carrier in an end-to-end arrangement. The leading and trailing ends of each of the binder strips are secured to the elongated carrier by a pair of securing members, with each securing member having one end secured to the carrier and another end which extends over the binder strip.

The cassette further includes a drive apparatus for unwinding the binder strip roll to provide an unwound portion of the binder strip roll. A separating apparatus is provided which is disposed within the cassette housing for separating the binder strips from the elongated carrier of the unwound portion of the binder strip roll to produce a separated binder strip, with the unwinding by the drive apparatus causing the separated binder strip to be at least partially ejected through a binder strip eject opening in the cassette housing. The leading securing member functions to release the leading end of the binder strip at the beginning of the ejection as does the trailing securing member as the binder strip exists the cassette.

DETAILED DESCRIPTION OF THE INVENTION

Figure 3:
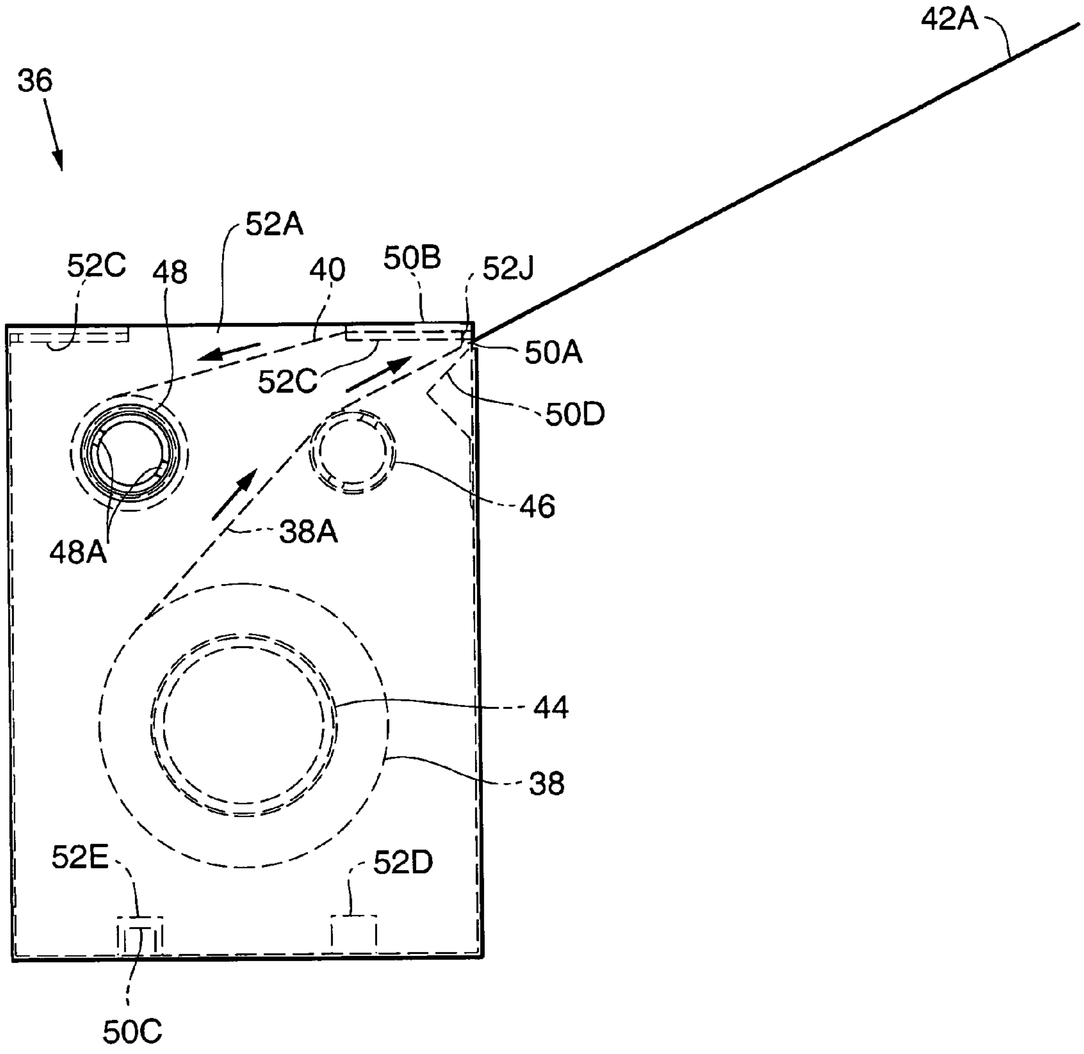
FIG. 3 is an elevational view side view of a binder strip cassette in accordance with a first embodiment of the present invention.
Figure 4:
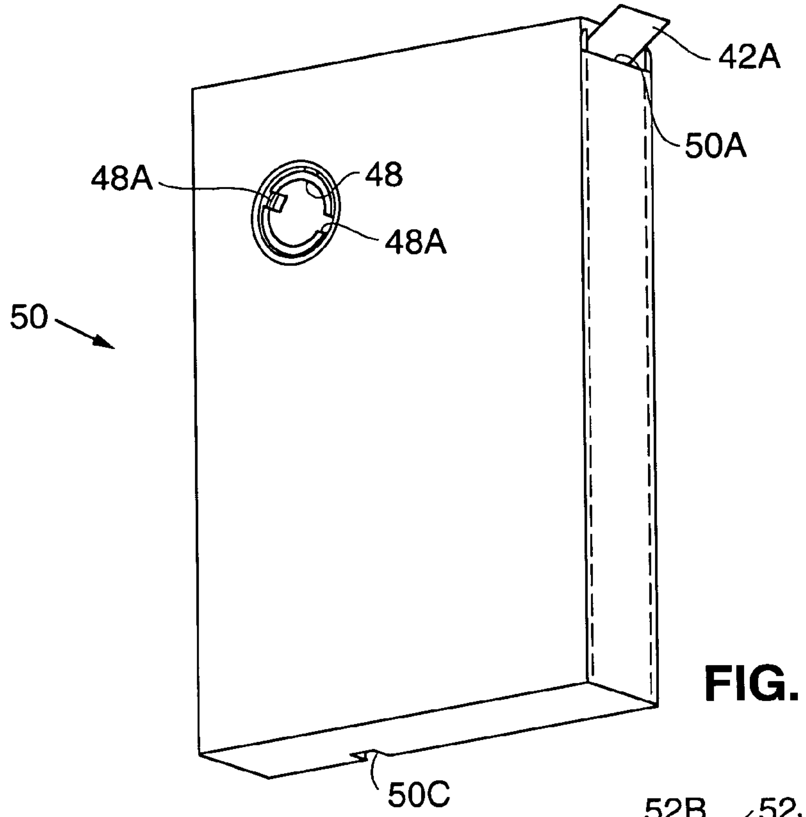
FIG. 4 is a perspective view of the FIG. 3 first embodiment binder strip cassette showing the outer case.
Figure 5:
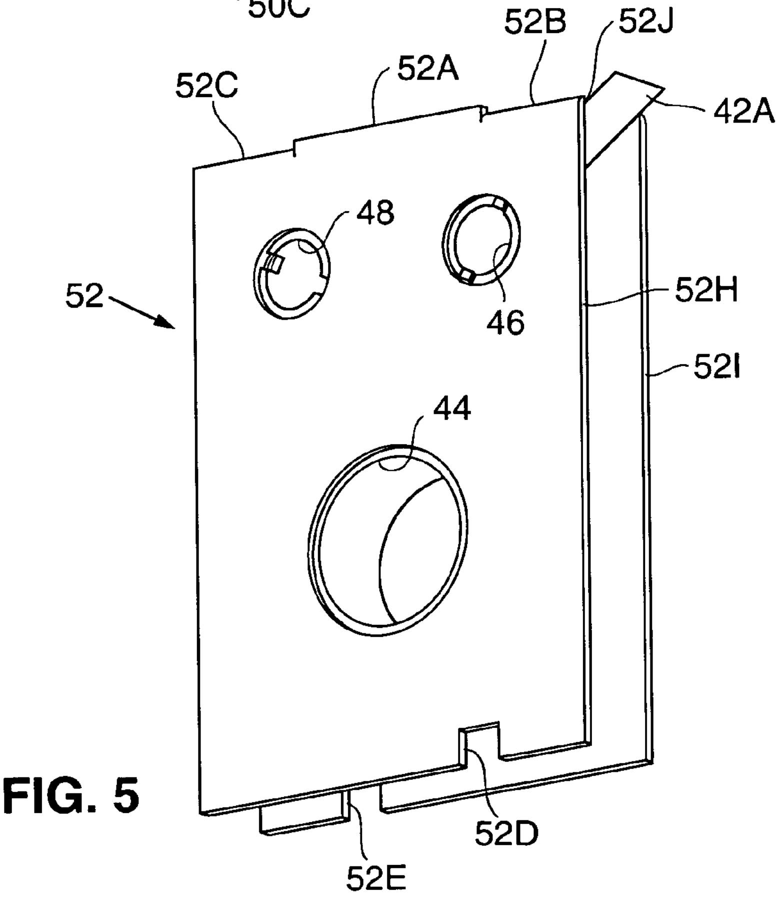
FIG. 5 is a perspective view of the internal frame member of the first embodiment binder strip cassette.
Figure 6:
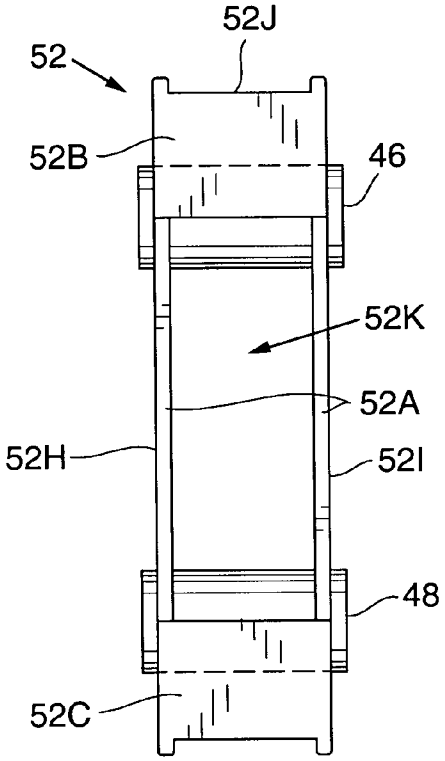
FIG. 6 is an end view of the internal frame member of the FIG. 3 binder strip cassette.

Referring again to the drawings, a first embodiment binder strip cassette, is shown in FIGS. 3, 4 and 5. The cassette, generally designated by the numeral 36, includes a roll 38 of individual adhesive binder strips 42 supported on a continuous elongated carrier 40. A very low tack adhesive is used to secure the substrate side of the strip to the carrier, with the strip being disposed on the inner surface of the carrier. One suitable adhesive for this application is type HL2268, from H.B. Fuller of St. Paul, Minn. In that the continuous carrier 40 is disposed on the exterior side of the roll, the carrier functions to hold the roll together. Roll 38 is rotatably mounted on a main roller 44, which is preferably made of heavy paper tubing. As shown in FIG. 5, the cassette includes an inner frame member 52, preferably manufactured from a single sheet of corrugated cardboard or other semi-rigid recyclable material. The inner frame member 52 is disposed within an outer case 50 as can be seen in FIG. 4. Case 50 is also preferably made of recyclable material, with a rigid paper such as 30-point chip board, being found suitable for the present application. Frame member 52 is preferably fabricated from a single sheet of material that is folded in two places to provide a pair of facing side members 52H and 52I as shown in FIGS. 5 and 6 which are interconnected by web members 52B and 52C. FIG. 6 does not show the main roller 44 or the binder strip roll 38 for purposes of clarity.

A pair of openings (not designated) are formed in the opposite spaced-apart side members 52H and 52I of the frame member 52 to receive the main roller 44 of the binder strip roll 38. The spacing between the facing side members 52H and 52I of the frame member is equal to the width of the web members 52B and 52C of the frame and is also substantially equal to the width of the binder strip roll 38. The roll 38 thus contributes to the overall rigidity of the cassette until the roll is essentially completed. As will be described, another roller takes up the elongated carrier 40 so that the wound up carrier also contributes to the rigidity, particularly when the binder strip roll 38 is substantially depleted. Note that the thickness of the cassette is adjusted to conform to the width of the binder strips and associated elongated carrier 40. The roller 44 is captured by the opposing inner surfaces of the outer case 50. An unwound portion 38A of the binder strip roll is guided to be proximate a binder strip ejection opening 50A formed in the outer case 50 by way of a rotatably mounted idler roller 46. Roller 46, which is also preferably made of heavy paper tubing, is rotatably mounted within opposing openings (not designated) in the frame member 52 and is also secured in place or captured by the inner surfaces of outer case 50.

Figures 8A, 8B, 8C:
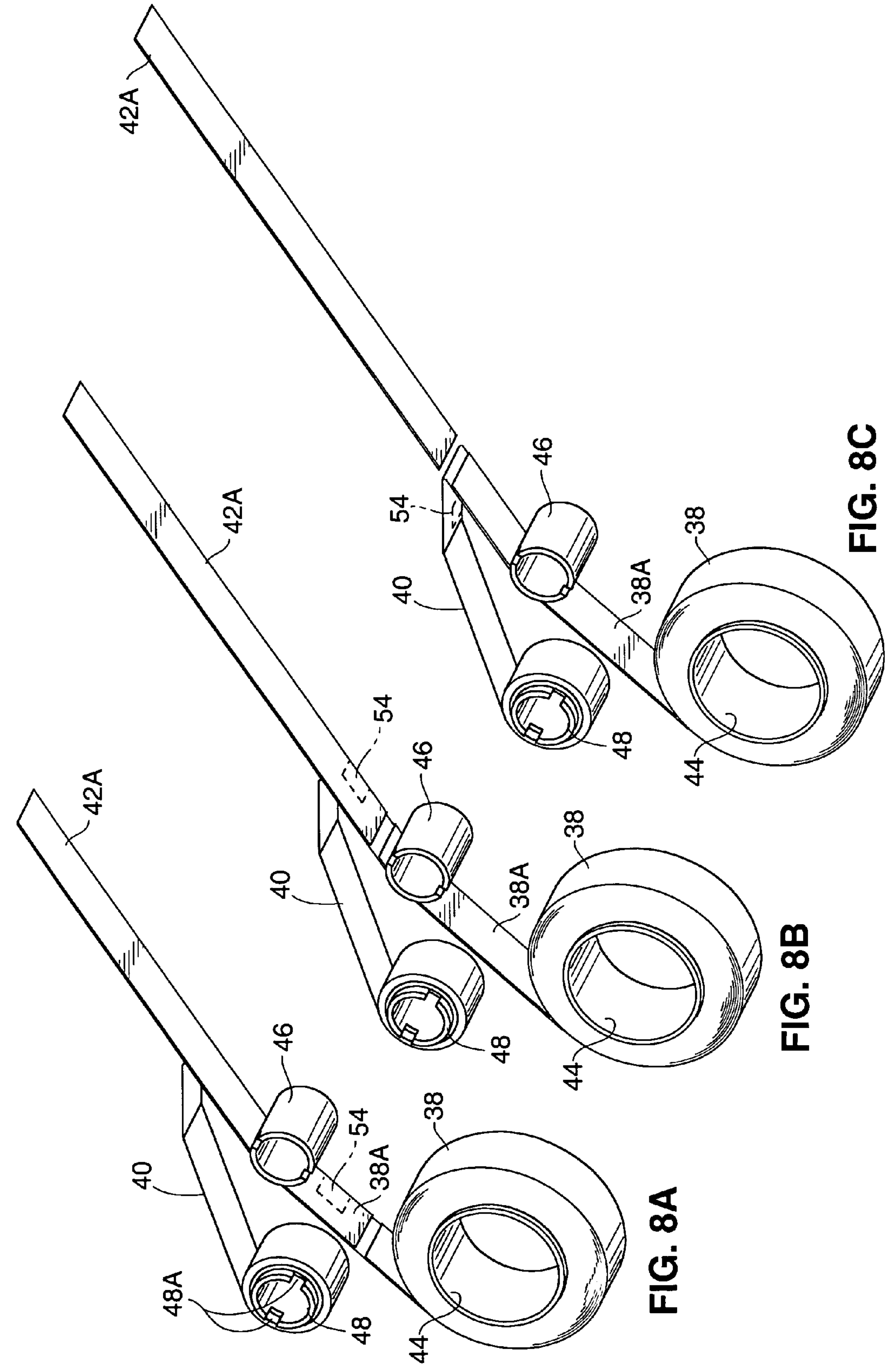
FIGS. 8A-8C are schematic representations of a binder strip ejection sequence for the subject binder strip cassette.

The unrolled segment 38A of the binder strip roll 38 extends to edge 52J (FIGS. 3 and 6) of web member 52B of the frame member. The elongated carrier 40 is then drawn around edge 52J and along the surface of the web member 52B. A pair of extensions 52A in the frame member 52 define a passage way between outer case 50 and web member 52B through which carrier 40 passes. The action of carrier 40 making a relatively sharp turn over edge 52J and down the face of web member 52B causes the carrier 40 and the leading edge of the individual binder strip 42A to begin to separate as shown in FIG. 3 thereby starting the binder strip ejection sequence. FIGS. 8A-8C illustrate the complete ejection sequence, with the outer case 50 and frame member 52 not depicted. The somewhat rigid binder strip 42A will tend to continue moving in a linear path through the strip ejection opening 50A in cover 50 as can best be seen in FIG. 3 and in FIG. 4.

Figure 9:
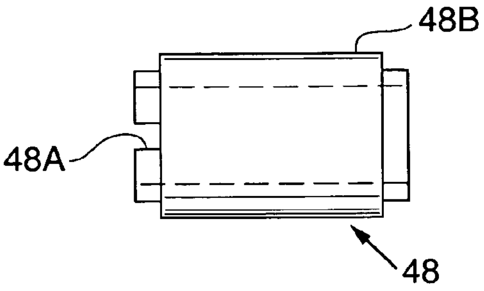
FIG. 9 is a side elevational view of the take up roller of the first embodiment binder strip cassette.

The underlying elongated carrier 40 is drawn through an opening 52K in the frame member intermediate web members 52B and 52C to a driven take up roller 48. The elongated carrier 40 is wound around take up roller 48, with roller 48 being rotatably driven through an access opening formed in cover 50 as shown in FIG. 4. Roller 48 is preferably made of heavy paper tubing and includes a pair on opposing cutouts 48A that can be used to key the roller to an external drive mechanism. In that roller 48 is not captured on both sides by outer case 50, roller 48 includes a center section 48B of exterior paper tubing to slightly increase the exterior diameter of the roller as shown in FIG. 9. The center section 48B has a diameter greater than the access opening in frame member 52 so that roller 48 will be captured between frame members 52H and 52I of the frame. Idler roller 46 can be identical to roller 48, including the presence of the non-functional cutouts, so as to reduce fabrication costs.

Referring to FIG. 8A, the binder strip 42A is shown approximately one-half way through the ejection sequence. Idler roller 46 functions to position segment 38A relative to edge 52J to ensure that the underlying elongated carrier 40 will be forced to make the above-described sharp turn. Preferably, a guide member 50D (FIG. 3) is formed in outer case 50, which is positioned adjacent eject opening 50A and intermediate the two facing sides 52H and 52I of the frame member. Guide member 50D functions to control, to some extent, the direction which the binder strip 42A takes exiting the cassette 36.

During the binder strip ejection sequence shown in FIGS. 8A-8C, the binder strip is being fed into the binding machine at a controlled rate. The state of the binder strip ejection sequence can be monitored by the binding machine 30 using encoded indicia present on elongated carrier 40. Preferably, the encoded indicia are sensed by sensors disposed within a cassette holding apparatus to be described, with the sensor outputs being forwarded to the binding machine. The processing of the sensed indicia can be divided, as desired, between a controller present in the cassette holding apparatus and the controller of the binding machine 30. The encoded indicia can be printed on or punched though selected locations on the carrier 40 since the position of the carrier correlates very well with the actual position of the binder strip 42A during ejection. Preferably, the encoded indicia is positioned on the face of the elongated carrier positioned adjacent the binder strip. By way of example, as can be seen in FIG. 8A, indicia 54 is located on the surface of carrier 40 which is contacting the binder strip 42A.

Figure 7:
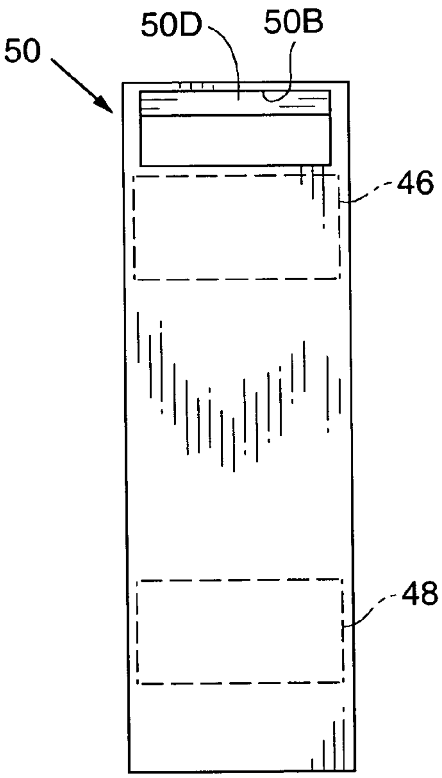
FIG. 7 is an end view of the binder strip cassette of FIG. 3.

As the strip continues in the ejection sequence, the indicia will eventually pass over edge 52J and down across web member 52B where the indicia is viewable through opening 50B (FIG. 7). In one instance, when an optical sensor on the binding machine detects the presence of the indicia through opening 50B, the binder strip is essentially at the point where the strip is being separated from the carrier 40. At that point, the conventional binding machine 30 strip loading mechanism is free to complete loading of the strip by drawing the strip into the binding machine. Further, the drive to take up roller 48 can be stopped so that no further binder strip feeding takes place while the binder is completing a binding operation. In this example, the there would be encoded indicia 54 for every binder strip on the binder strip roll 38, as will be further described in connection with FIGS. 11A-11D.

Figures 10A, 10B, 10C:
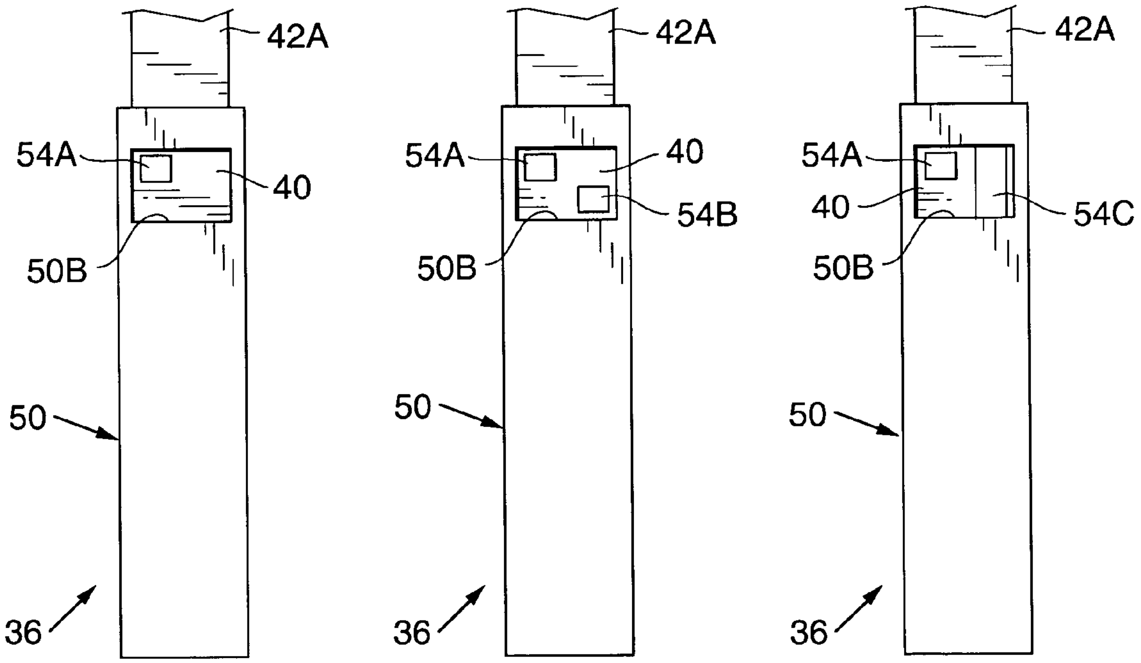
FIGS. 10A-10C are end views of the first embodiment binder strip cassette showing the encoding present on the elongated carrier being displayed through an opening in the cassette housing.

Encoded indicia can also be used to indicate that the binder strip roll 38 has almost been used up. In that case, the indicia would be placed on the carrier 40 near the end of the roll. Indicia performing differing functions can be distinguished from one another based upon the lateral location of the indicia on the carrier 40. In that event, two separate laterally spaced optical sensors A and B that are disposed external to the cassette on a cassette holding apparatus are used. By way of example, FIG. 10A shows a cassette 36 where the binder strip 42A is at the point of being released from the carrier 40 as also shown and described in connection with FIG. 8C. Indicia 54A on one side of carrier 40 is shown in opening 50A indicating the strip is at the release point. FIG. 10B shows another state of the binder strip roll 38*l* where indicia 54A again indicates that a binder strip 42A is being released. In addition, a second indicia 54B, laterally spaced from indicia 54A, is used to indicate that the roll is about completed, with only a few strips remaining. Indicia 54B is detected with the second sensor. Finally. FIG. 10C shows the roll when empty, with the first sensor detecting indicia 54A again indicating that the strip is being releases and with the second sensor detecting indicia 54C that the strip being released is the last strip on the roll. Indicia 54C is longer than indicia 54B so that the second sensor is able to determine that the indicia is indicating an end of roll rather than a near end of roll. A fourth condition not depicted exits when no indicia is present in opening 50A thereby indicating the a strip is in the middle of a feeding sequence.

Alternatively, indicia may be printed in more complex patterns similar to conventional bar codes. With a higher information density, the code may change throughout the roll 38 to indicate the number of strips remaining on the roll. Encoded indicia in the form of simple bar codes could also be used to identify the type of binder strip present in the cassette. A number of types of bind can be done with thermal binder strips, including conventional strip-bind, perfectback binding and padding. In addition, there may be variations with special strip finishes and for binding specialized page stocks. Each bind type may require a different binder strip type that would be detected by the binding machine for proper operation. Additionally, indicia could identify the binder strip length, which will vary, for example, from 11 inches for standard letter size or 297 mm for standard A4 size. Further, the indicia could be used to identify the width, color or other characteristics of the binder strip.

Figure 26:
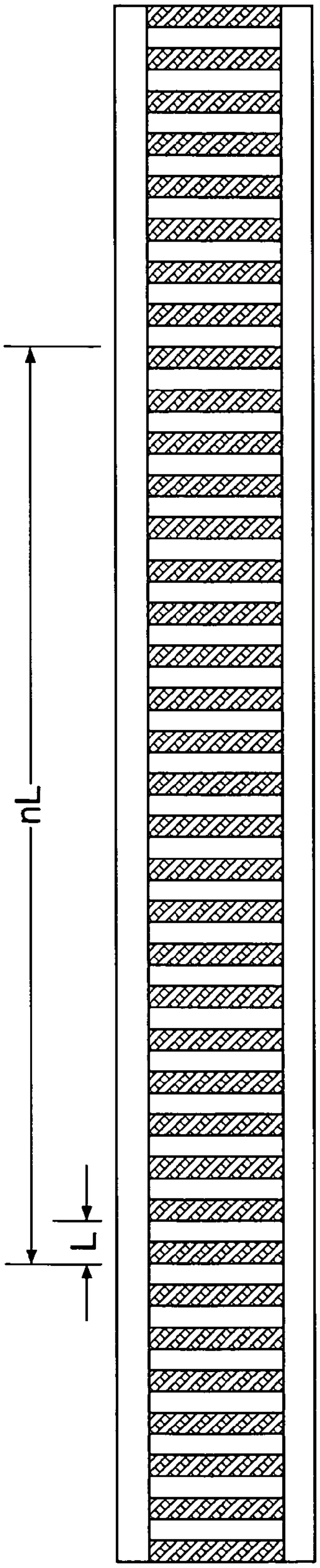
FIGS. 26 and 27 depict further examples of encoding patterns that can be incorporated into the elongated carriers.

Another possible application for the indicia is shown in FIG. 26. In this design, alternating low and high reflectivity marks having a uniform spacing L are printed along the length of the carrier 40. There is n number of marks for each binder strip 42. Alternatively, the carrier could be punched to produce a similar result. A controller can detect the rate at which the marks pass by opening 50B of the cassette and adjust the speed of the motor as needed. This allows for velocity control without need for an additional tachometer system.

Figure 27:
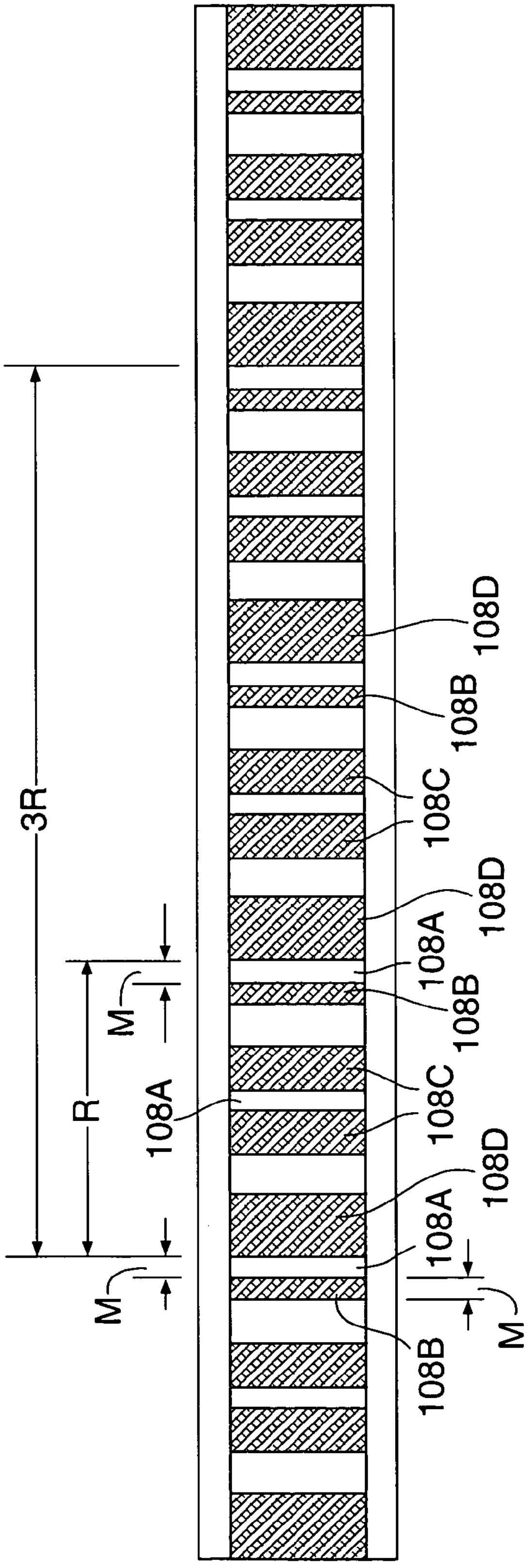

In yet another implementation, a repeating bar code may be printed or punched on carrier 40 as shown in FIG. 27. Because the bar code contains elements repeated with constant dimensions, the rate of the strip can be detected, as in the FIG. 26 implementation. In addition, other information can be readily encoded as desired using conventional bar coding techniques. The FIG. 27 implementation shows an exemplary pattern based on a constant module dimension M. Light bar 108A and dark bar 108B are both one module dimension M wide. Dark bar 108C is two module dimensions M wide and dark bar 108D is three module dimensions M wide. In this example, the bar 108D, which is three module dimensions M wide, serves as a divider between identical patterns R which are repeated three times (3R). Each of the patterns R is fourteen module dimensions M in length. The remainder of each of the repeating patterns encodes the desired detailed information and is comprised of an arrangement of dark bars that are one (108B) and two (108C) modules wide.

Certain other information regarding binder strip types can also be provided on the outer case 50. Printed encoded indicia can be applied to the case. Further, outer case 50 could include a selectable collapsible segment, such as segment 50C as shown in FIG. 4. That portion of the frame member 52 underlying segment 50C is provided with a notch 52E as shown in FIG. 5. This permits segment 50C to be selectively formed in the case 50. If, for example, A4 size binder strips are located in the cassette 36, the region of case 50 overlying notch 50C can pressed inward to form an indentation which can be sensed by the binding machine using a sensing switch or the like. If, for example, 11-inch size binder strips are in the cassette, no notch is formed in the case 50. Parallel cuts can be formed in case 50 over notch 52E to facilitate this process.

Figures 11A, 11B, 11C, 11D:
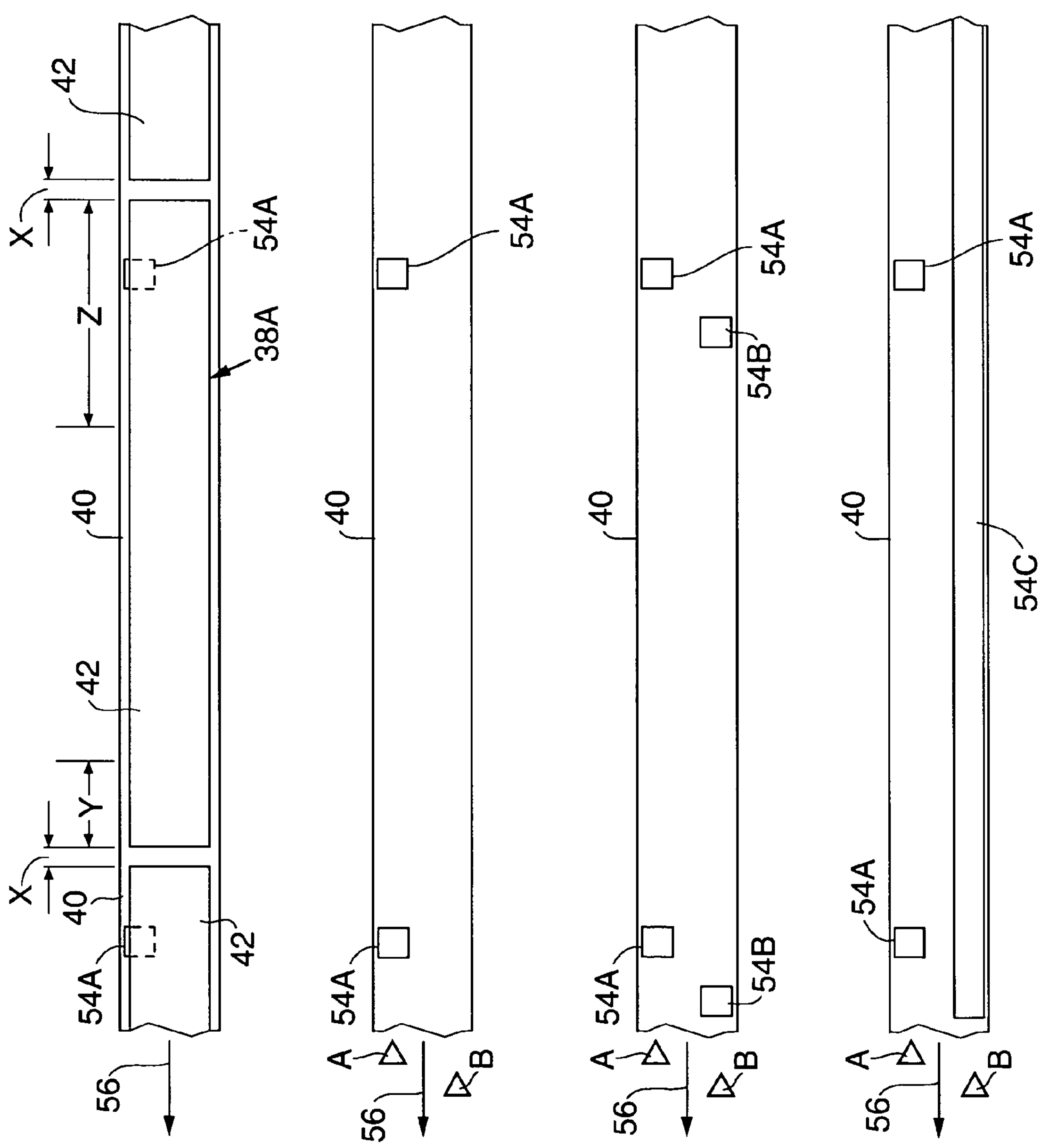
FIGS. 11A-11D show various exemplary encoding indicia which can be used in connection with the first embodiment binder strip cassette.

FIG. 11A shows of segment 38A of the binder strip roll 38. As previously described, the individual binder strips 42 are positioned along the length of the elongated carrier 40, with the substrate of the strip contacting the carrier. Thus, the thermal adhesives on the strips are facing toward the center of the binder strip roll 38. A typical roll may contain 100 or more binder strips 42, this being a large number of strips relative to the overall size of the subject binder strip cassette 36. This number can be increased significantly while maintaining a cassette size compatible with desktop binding machines. It is preferred that the strips be spaced a distance apart, such as distance X shown in FIG. 11A. Among other things, it has been found that when the strips and carrier are wound in roll form, the strips and carrier have a tendency to form wrinkles during the manufacturing process and over time. This is due to relatively thick combination of carrier and strip thickness that resists being wound around a relatively small radius of curvature. To avoid such wrinkling, which can mar the appearance of the bound book, the spacing between the strips functions to provide a form of relief, so that the strips can move slightly relative to the overlying carrier. It has been found that a spacing X on the individual strips should be at least 0.040 inches.

Typically, the binder strips are manufactured as a single long strip and then cut to the individual lengths. This can result in the production of debris that needs to be removed. Preferably, the adhesive securing the strips 42 to the carrier 40 is not present in the regions near the ends of the strip adjacent spacing X so that the debris can be easily removed. This region Y where adhesive is absent from the leading edge of the binder strip is typically 0.06 to 0.25 inches in length. A similar region lacking adhesive is disposed at the trailing edge of the binder strip for the same purpose of facilitating debris removal. However, it is preferable, that the adhesive between the binder strips 42 and carrier 40 be absent in the region along length Z along the trailing end of the binder strip for reasons other than debris removal. This is because, when the strip is driven in the direction indicated by arrow 56 over edge 52J (FIGS. 3 and 6), as the strip begins to separate from the carrier 40, the strip extending out of the cassette will be captured by the strip transfer mechanism of the associated binding machine 30 and pulled into the machine. At this point, the binder strip drive function provided by carrier 40 is no longer needed to eject the strip from the cassette. Thus, the adhesive is no longer needed to secure the strip to the carrier. The binder strip will then be essentially free of the carrier 40, so that the binder strip feed mechanism of the binding machine can continue to pull the strip out of the cassette at a rate somewhat greater than the rate at which the carrier 40 is driven to eject the strip from the cassette. This reduces the degree to which the binder strip feed mechanism of the binder machine 30 needs to be synchronized with the drive to the take up roller 48. If an adhesive were present in region Z and if the binder strip feed mechanism were to take up the strip faster than it was being fed by the take up roller, the strip feed mechanism would advance the carrier at a rate faster than roller 48 could take up the carrier 40. This would most likely cause the cassette mechanism to malfunction. Preferably, region Z, the region adjacent the trailing end of the strip, be free on adhesive. Region Z preferably comprises at least 20% of the total length of the binder strip.

Figures 12, 13:
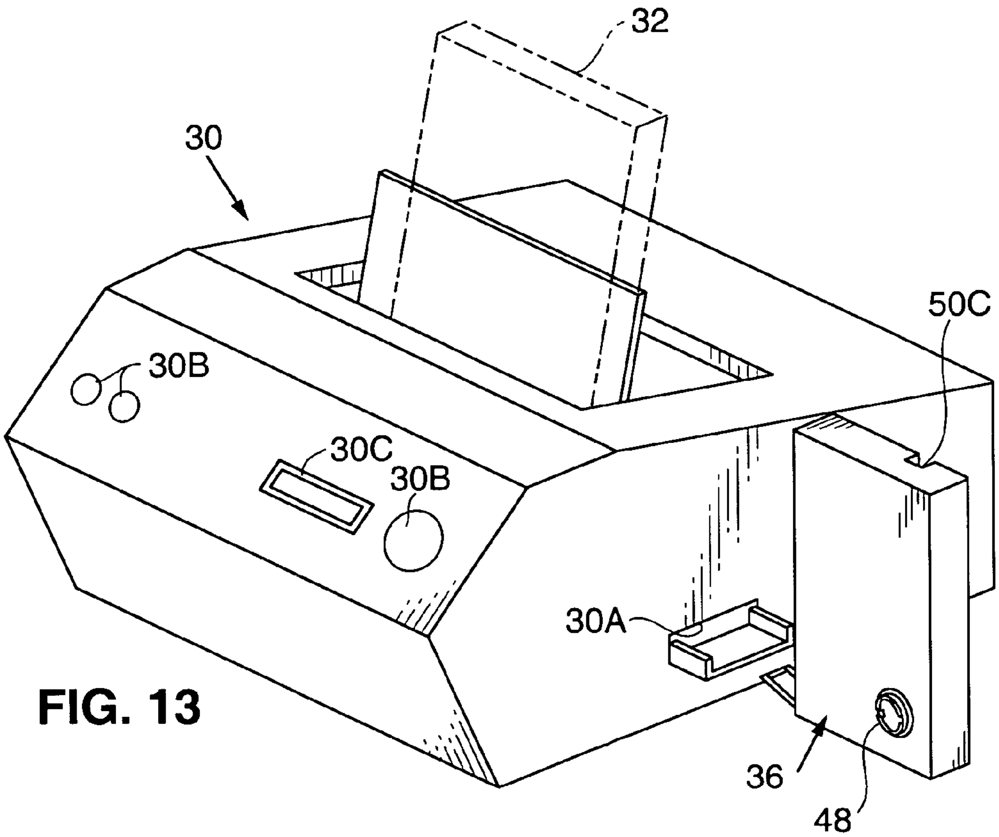
FIG. 12 is a table showing the manner in which the indicia of FIGS. 11A-11D are decoded.
FIGS. 13, 14 and 15 depict the first embodiment binder strip cassette in combination with a prior art binding machine.

As previously described, encoded indicia 54 can be used to provide various information regarding the state of the subject binder strip cassette including the type of binder strip present in the cassette, the amount of binder strips remaining in the cassette and the location of the binder strips during feeding of the strips into the binding machine. One approach is to use a pair of optical sensors A and B, shown schematically in FIGS. 11B through 11D, that are disposed within a cassette holding apparatus to be described. The sensors A and B are positioned along the path 56 taken by the elongated carrier 40 as the carrier passes by opening 50B of the cassette, and on opposite sides of the center axis of the carrier. Referring to FIG. 11B, the depicted indicia 54A on only one side of the path will be sensed by sensor A when that indicia passes by the sensor. There is an indicia 54A at this location for each of the binder strips 42 on the roll. There is no corresponding indicia on the other side of the axis, so that sensor B senses nothing when sensor A detects indicia 54A. These conditions indicate that the feeding of a binder strip into the binding machine is sufficiently completed such that the drive to the drive cassette take up roller 48 is to be stopped. This is also shown in the table of FIG. 12. When neither indicia being detected, the strip is in a strip feeding position as also shown in FIG. 12.

Figure 1:
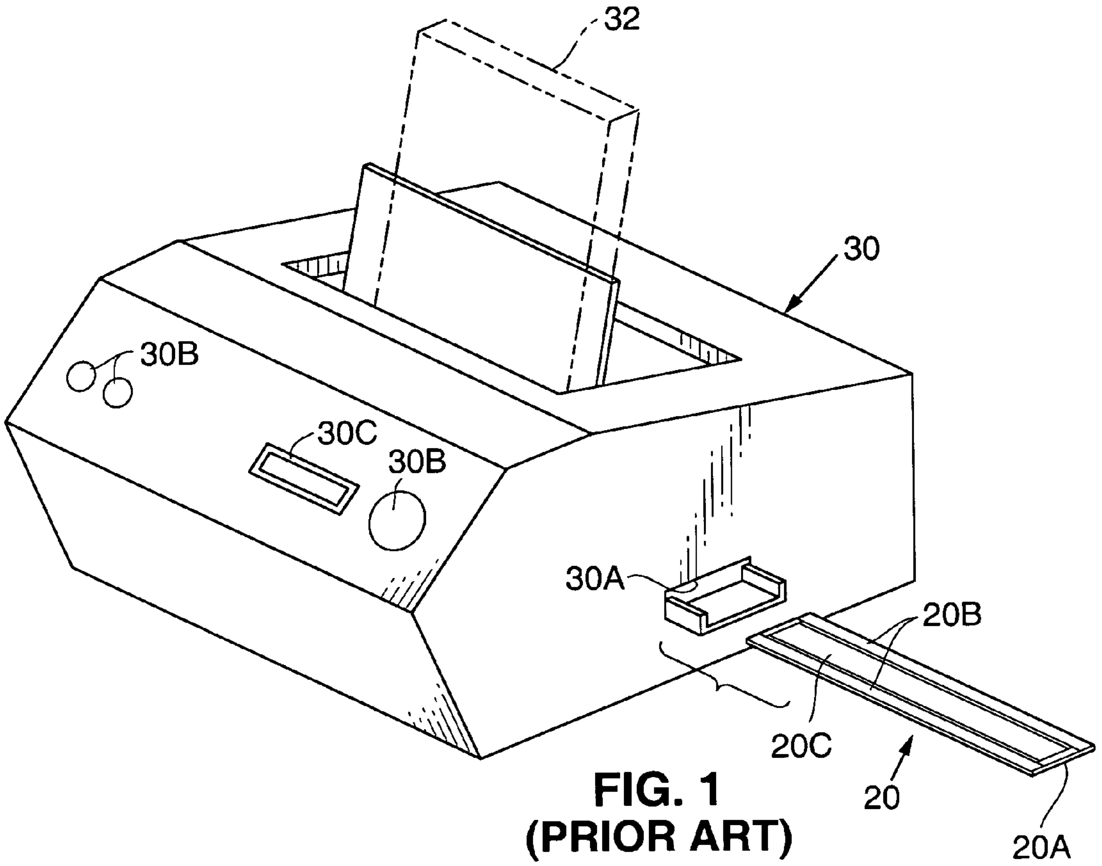
FIG. 1 (PRIOR ART)
FIG. 1 depicts prior art binding machine receiving a thermal adhesive binder strip.
Figure 2:
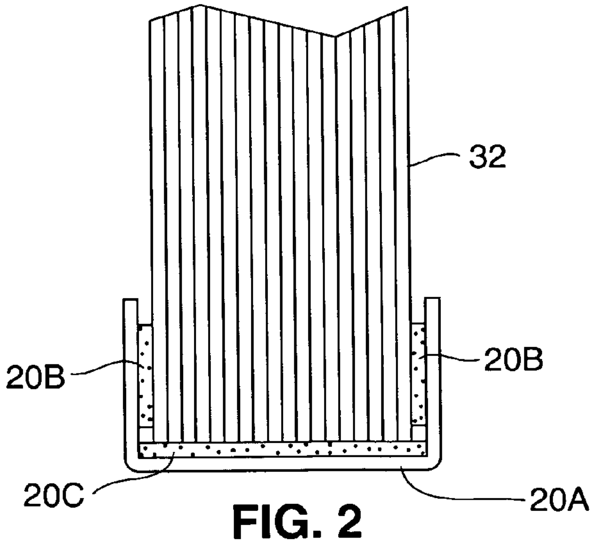
FIG. 2 (PRIOR ART)
FIG. 2 is a partial elevational side view of the edge of a stack of sheets bound by the FIG. 1 binding machine using the FIG. 1 binder strip.

FIG. 11C shows exemplary indicia indicating the cassette is running low, with indicia 54A being repeated as in FIG. 11B and with an additional indicia 54B being added. This pair of indicia is positioned as shown for the last few strips on the roll. Detection of this condition, also shown in the table of FIG. 12, can be used to cause a warning indication to be shown on the display 30C of the binding machine (FIG. 1) notifying the user that the cassette is almost empty. Indicia 54A of FIG. 11C further functions as a stop feed indication as previously described in connection with FIG. 11A. Finally, FIG. 11D, shows the indicia 54A and 54C indicating the last strip of the roll. Indicia 54C begins at the same location relative to the last strip as does indicia 54B of FIG. 11C and continues along the full length of the last binder strip and a substantial distance past the last strip. Indicia 54A terminates at the usual location thereby indicating that the strip feed has been completed. After a small additional drive, indicia 54A is not longer detected. Detection of this condition where sensor B detects indicia 54C and sensor A detects nothing can be used to display a further message on display 30C to the user, indicating that the cassette is empty. This condition is also shown in the table of FIG. 12.

The above-described indicia and the information provided by such indicia are intended to be exemplary only. Conventional bar codes and other more sophisticated encoding techniques could also be used to provide a greater range of information useful in the binding process. By way of example, coding could be used to uniquely identify each strip of a roll so if a cassette is removed for some reason, such as to permit another cassette to be used, the replaced cassette can be readily recognized and the remaining number of binder strips displayed.

Figure 14:
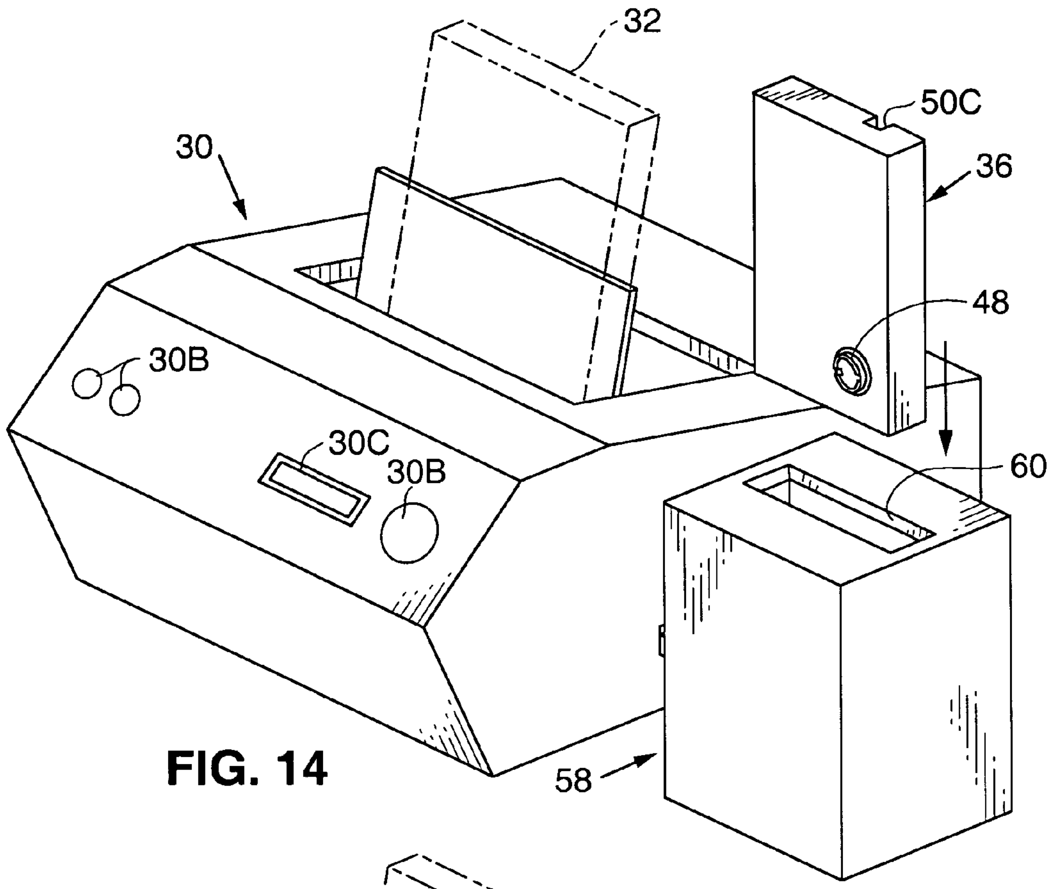
Figure 15:
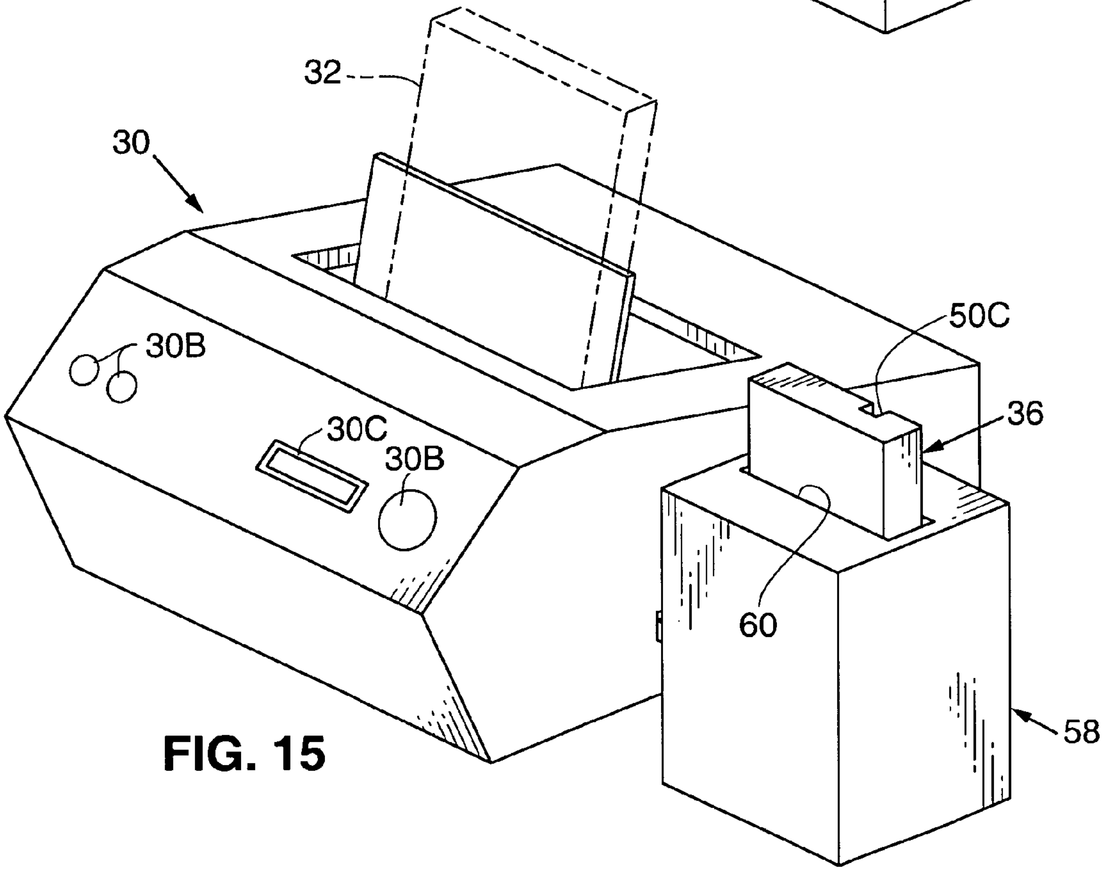
Figure 16A:
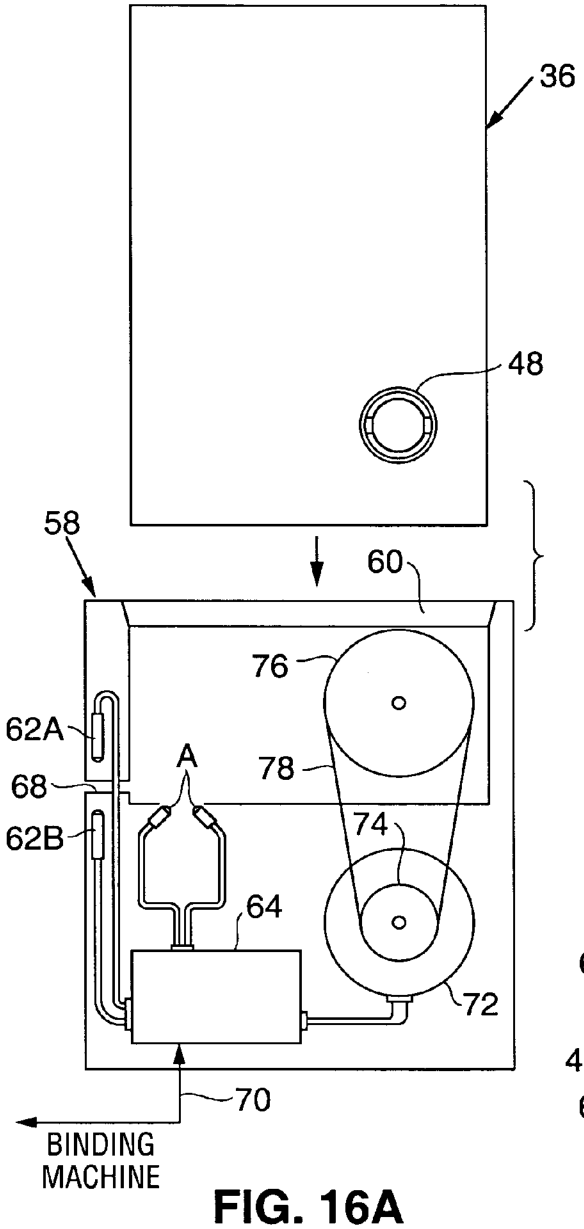
FIGS. 16A-16B show one type of cassette holding apparatus for use in connection with the first embodiment binder strip cassette.
Figure 16B:
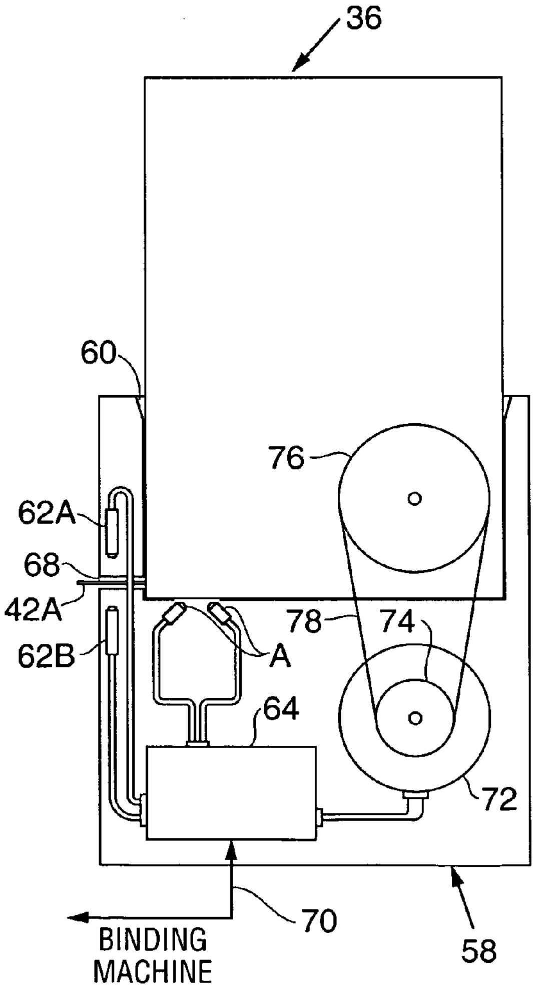

FIG. 14 depicts an exemplary cassette holding apparatus 58 for receiving the subject cassette 36 and for interfacing the cassette with a prior art binding machine 30. FIG. 13 shows the orientation of the cassette 36 relative to binding machine achieved by the holding apparatus 58, with the holding apparatus itself not being depicted. The binder strip ejection opening 50A of the cassette is positioned opposite the binder strip input opening 30A of the binding machine. FIG. 15 shows a cassette 36 inserted in the cassette holding apparatus 58, with the holding apparatus being positioned relative to the binding machine 30 for carrying out a binding operation. FIGS. 16A and 16B are cutaway views of the cassette holding apparatus 58 showing details of the apparatus construction. An electrical interface 70 is provided between the holding apparatus 58 and the binding machine 30. An existing binding machine interface connector, used for controlling a conventional binder strip printer, can be readily adapted for this purpose. Among other things, the interface 70 can be used to provide power to the holding apparatus 58 and to provide control signal paths between the holding apparatus and the binding machine. By way of example, interface 70 could carry information to be displayed by the binding machine based upon the indicia 54 indicating the cassette 36 is near empty.

The holding apparatus 58 includes a drive motor 72 which drives the cassette take up roller 48 through drive pulleys 74 and 76 and drive belt 78. The previously described optical sensors A and B are positioned so that they are disposed opposite opening 50B and can sense the presence or absence of the indicia on the elongated carrier 40. Each sensor includes an optical transmitter for illuminating the carrier 40 and an optical detector for detecting the reflected light, with the reflective light magnitude being indicative of the presence or absence of an indicia. Only sensor A is depicted for sensing indicia on one side of the carrier, with sensor B being positioned for sensing indicia on another side of the carrier and with sensor B being offset from sensor A as illustrated schematically in FIGS. 11B through 11D.

Operation of the drive motor 72 is controlled by a suitably programmed micro-controller 64, primarily in response to the outputs of sensors A and B and control signals from the binding machine indicating that a binder strip is needed. The implementation of the micro-controller is straightforward and will not be described so as not to obscure the description of the invention in unnecessary detail. Basically, when the binding machine has started up or has completed a binding operation and is ready for a further binding operation, the binding machine 30 will send a command to the cassette holding apparatus 58 by way of interface 70 that a binder strip of a certain width is needed. If the cassette 36 contains a binder strip of incorrect width, the holding apparatus 58 will signal the binding machine that another cassette must be loaded in the holding apparatus. Assuming that cassette type is proper, micro-controller 64 can signal motor 72 to proceed to load a binder strip 42A into the binding machine. As can be seen in FIG. 16B, a binder strip is fed through the strip opening 50A of the cassette, with the strip being separated from the carrier 40 in the process. As also shown in FIG. 16B, the strip 42A exiting the cassette will pass through a strip exit port 68 of the holding apparatus into the strip input opening 30A of the binding machine. As the strip is being fed into the binding machine, the indicia 54 associated with the strip being loaded will pass by opening 50B so that the indicia can be sensed by sensors A and B. When sensor A senses an indicia 54A such as shown in FIGS. 11B through 11C, the associated binder strip is essentially free of the underlying elongated carrier 40 so that micro-controller 64 can command the drive motor 74 to halt. The binder strip loading mechanism of the binding machine will have sensed the presence of the binder strip and will draw the remainder of the strip into the binding machine. Once a binding operation is completed, the binding machine can then request a further binder strip. In the event that the cassette does not utilize encoding, optical sensors 62A and 62B can be used to detect the presence and absence of a binder strip disposed in the strip exit port 68 of the cassette holding apparatus. Although this approach is not preferred, these optical sensors, together with the sensors located within the binding machine itself, will provide sufficient information to permit the micro-controller 64 to control the operation of the drive motor 74.

Figure 17A:
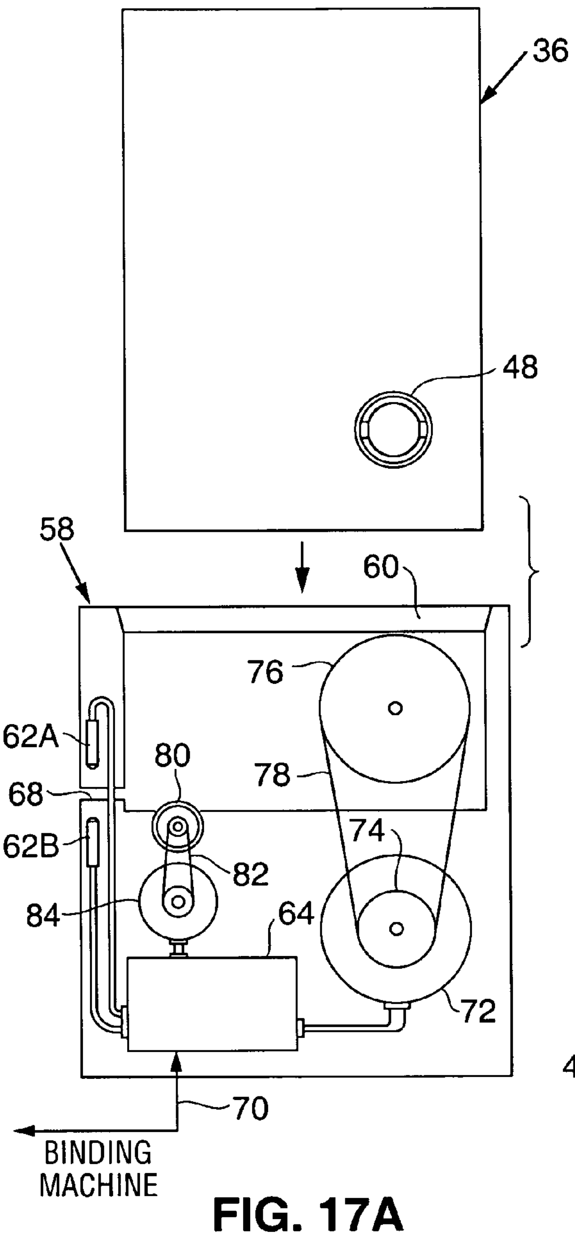
FIGS. 17A-17B show a second type of cassette holding apparatus for use in connection with the first embodiment binder strip cassette.
Figure 17B:
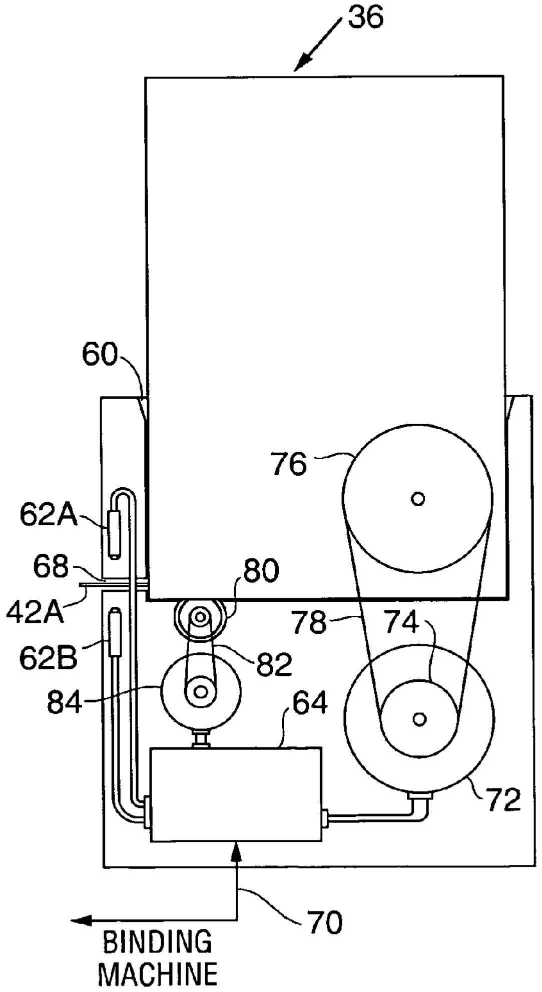

FIGS. 17A and 17B show an alternative arrangement for the cassette holding apparatus which provides a further alternative to encoding the carrier 40 or strip 42 itself. A roller 80 is provided which is positioned to engage the elongated carrier 40 as the carrier passes by opening 50B. The roller 80 is biased against the carrier 40 by a spring mechanism (not depicted) so that linear movement of the carrier translates to rotational movement of the roller. Roller 80, in turn, drives a conventional optical encoder 84 by way of a belt 82. By using a stepper motor or servomotor for the drive, the rotational speed of drive motor 72 is determined. Comparing the output of the encoder 84 to the speed of the drive motor indicates the diameter of the take-up roll 48 in the cassette. Given that the thickness of the carrier 40 is known, the diameter of the take-up roller indicates the length of the carrier 40 that has been driven thereby providing sufficient information to ascertain the number of binder strips 42 remaining in the cassette. This information is processed by micro-controller 64 and forwarded to the binding machine for display and other possible action.

Figure 18:
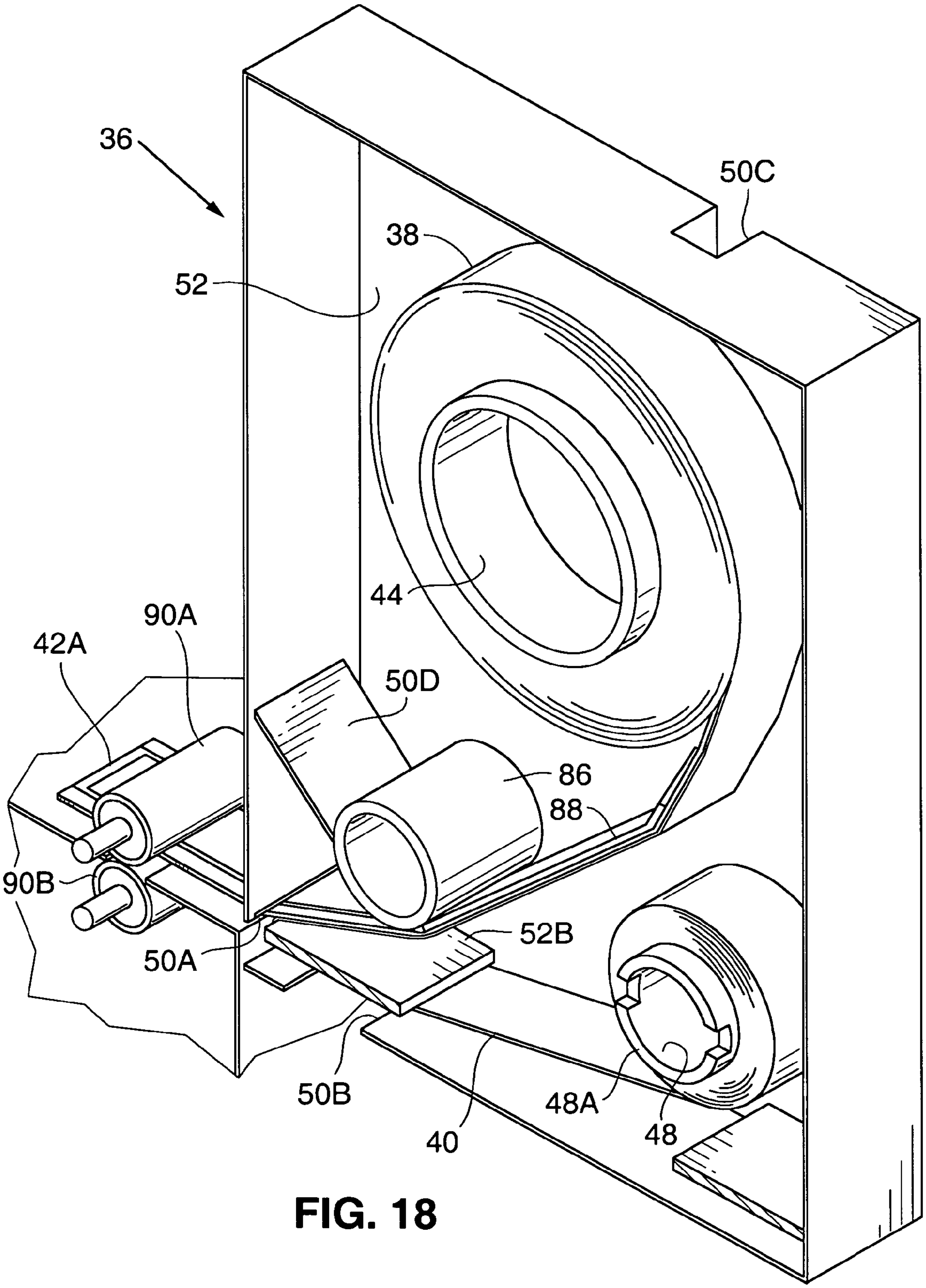
FIG. 18 is a cut away perspective view of a binder strip cassette in accordance with the second embodiment of the subject invention.
Figure 19:
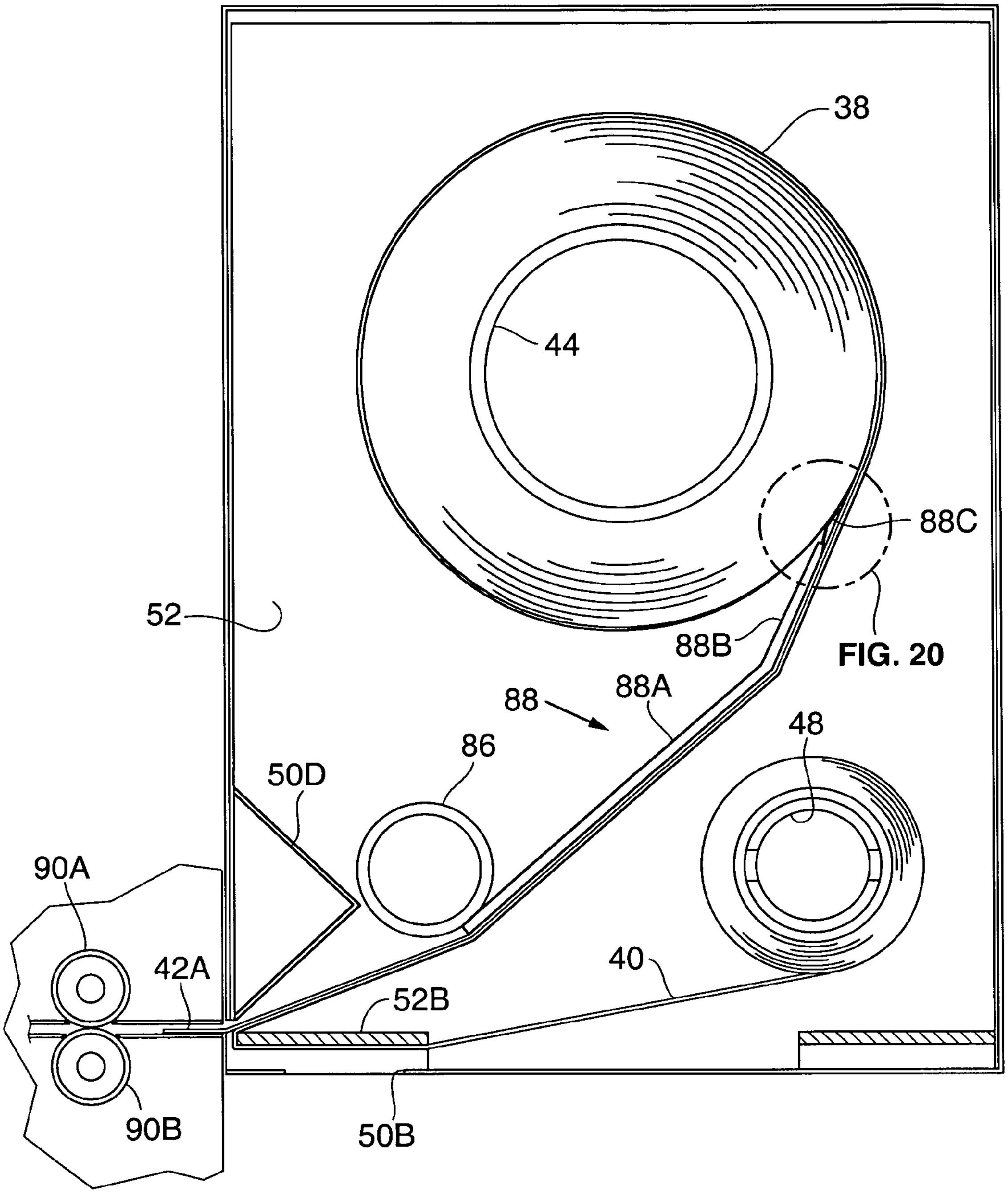
FIG. 19 is a cut away elevational view of the second embodiment binder strip cassette.

A second embodiment of the subject binder strip cassette 36 is shown in FIGS. 18 and 19. One advantage of this embodiment over the first embodiment is that the need for an adhesive to secure the binder strips 42 to the elongated carrier 40 is reduced or eliminated altogether. The cassette includes a pivoting primary guide 88 which, as will be described in greater detail, functions to deflect the normal path of the carrier 40 and binder strips 42 so as to slightly force the binder strip 42 in the process of being unwound against the overlying carrier 40. This force will tend to maintain the carrier 40 in contact with the overlying binder strips 42 in the region between the point where the carrier 40 and strips 42 leave the roll 38 and where the separated strips 42A exit the cassette. Given the slight degree of tackiness of the carrier 40, this action is sufficient to substantially reduce or eliminate the need for an adhesive to secure the strips 42 to the carrier 40.

Figure 21:
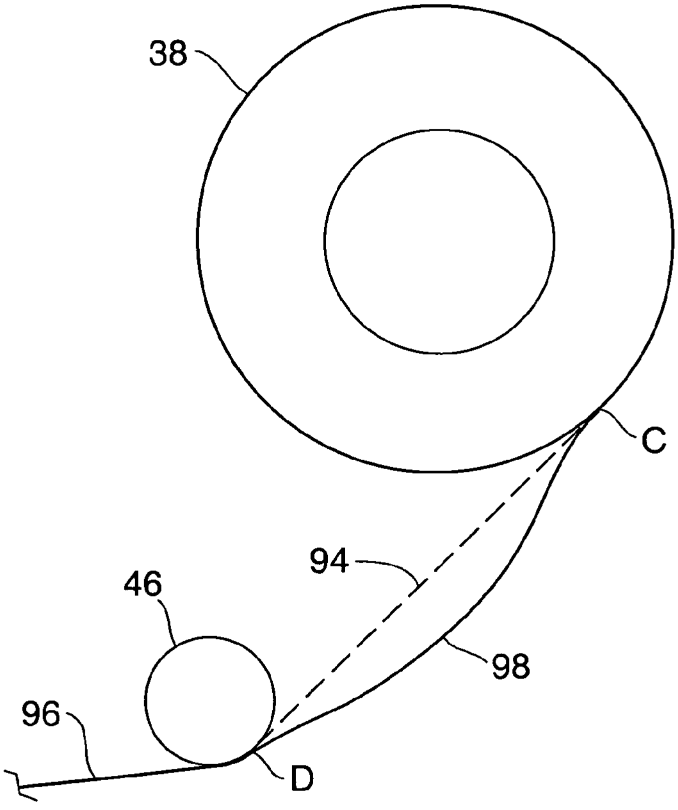
FIG. 21 is a schematic representation comparing certain aspects of the first and second embodiments of the subject binder strip cassette.

FIG. 21 is a schematic representation of the path taken by carrier/strip in the first embodiment cassette (FIG. 3) and the second embodiment cassette (FIGS. 18 and 19). The primary guide 88 is not shown in FIG. 21. As previously described, binder strip roll 38 includes an elongated carrier 40 which supports the individual binder strips 42. The roll 38 is formed so that the carrier 40 is disposed on the exterior of the roll. Thus, carrier 40 functions to secure the strips 42 in place when the strips are in roll form. When the roll is unwound, this compression force applied by the carrier 40 is no longer present. The carrier 40 and strips 42 of the first embodiment cassette will follow a path indicated by line 94 between a point C at binder strip roll 38 and point D at the idler roller 46, so that line 94 forms a tangent line with respect to the outer circumference of each of these elements. As a strip 42 comes off the roll 38, there is a tendency for the leading edge of the strip to separate from the carrier 40, especially if there is no adhesive present at this leading edge. The pivoting primary guide 88 of the second embodiment prevents this separation by causing the path taken by the carrier/binder strips to change from line 94 to line 98. The magnitude in the change in paths is somewhat exaggerated for purposes of illustration. The force applied to the binder strips 42 against the carrier 40 as a result of this path change functions to maintain the carrier in contact with the strips 42 as desired. As will be explained, this force can be well controlled and tends to be substantially independent of the amount of binder strips remaining on roll 38.

Figure 22:
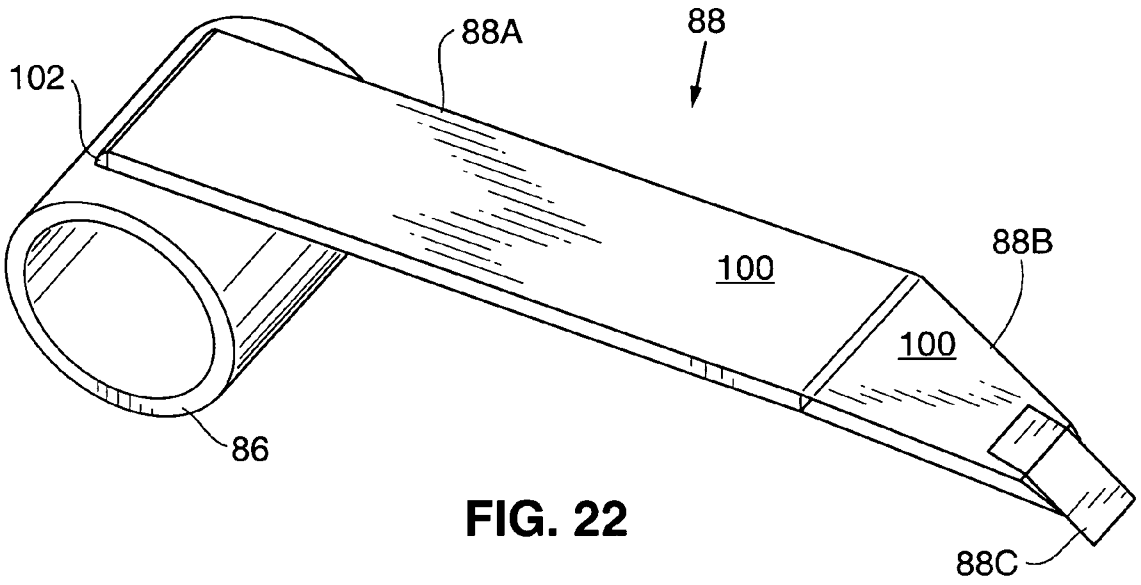
FIGS. 22 and 23 are respective perspective and elevational views of the primary guide of the second embodiment binder strip cassette.
Figure 23:
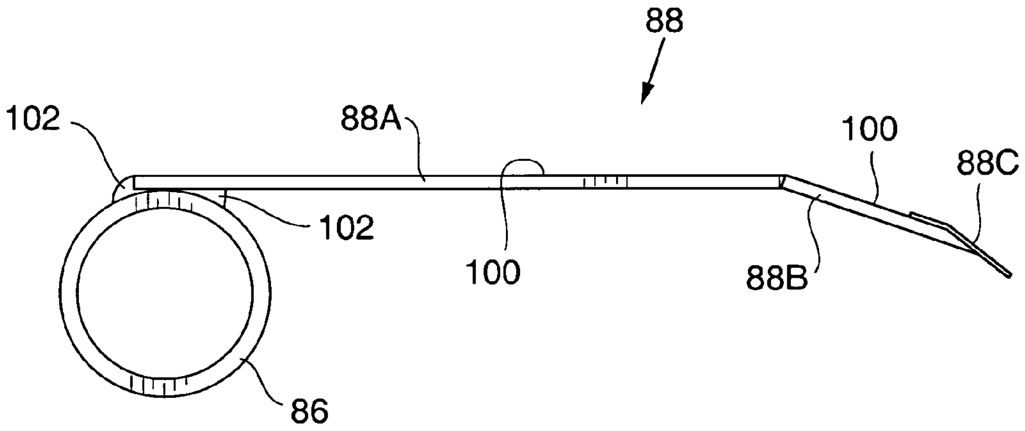

Referring again to FIGS. 18 and 19, primary guide 88 can be seen, pivotally mounted on pivot mount 86. As can be seen in FIGS. 22 and 23, pivot mount 86 is basically a paper tube much like idler roller 46 of the first embodiment cassette. Mount 86 is secured in corresponding openings in frame member 52 so that the mount can rotate in the openings. As was the case of idler roller 46, outer case 50 extends over the frame openings and thus captures the mount 86 in place. Primary guide 88 is secured to the periphery of mount 86 by an adhesive 102 as can be seen in FIG. 23. Primary guide 88 includes an elongated main member 88A and a bent member 88B. Both members 88A and 88B are made of recyclable materials such as cardboard. A thin contact member 88C made, for example, from a sheet of polyester plastic, is secured to the end of bent member 88B.

Figure 20:
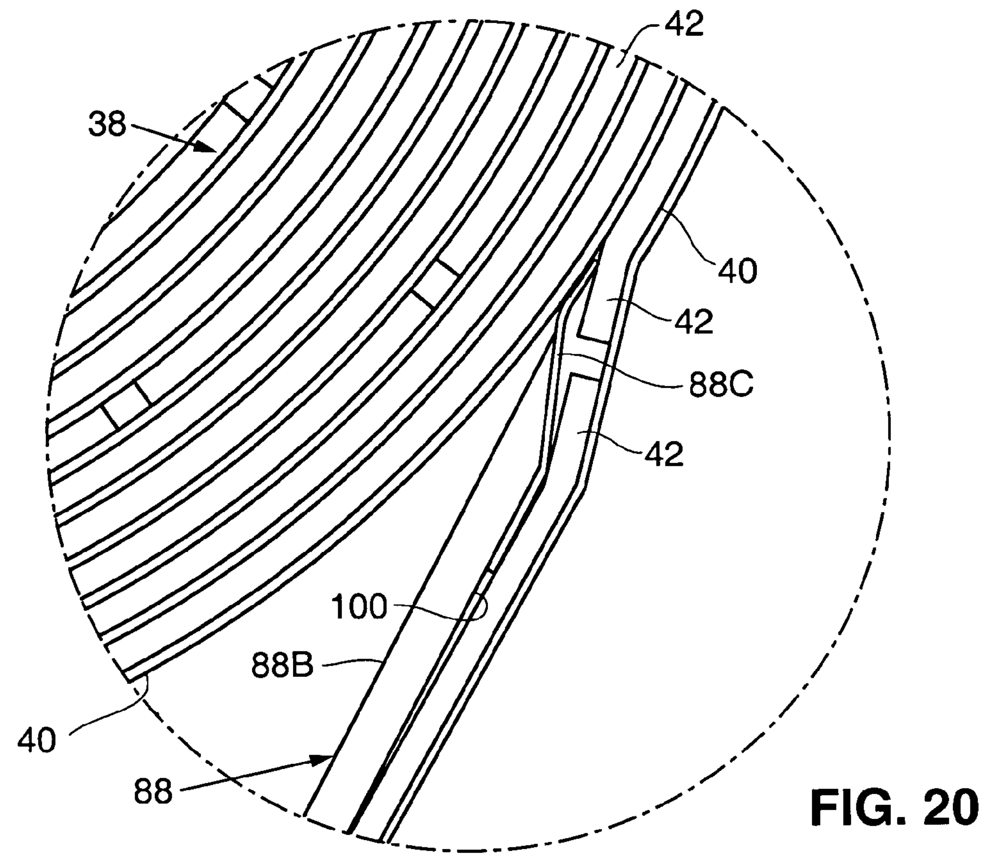
FIG. 20 is an enlarged potion of FIG. 19 showing details of the primary guide of the cassette for guiding the binder strips and carrier.
Figure 24:
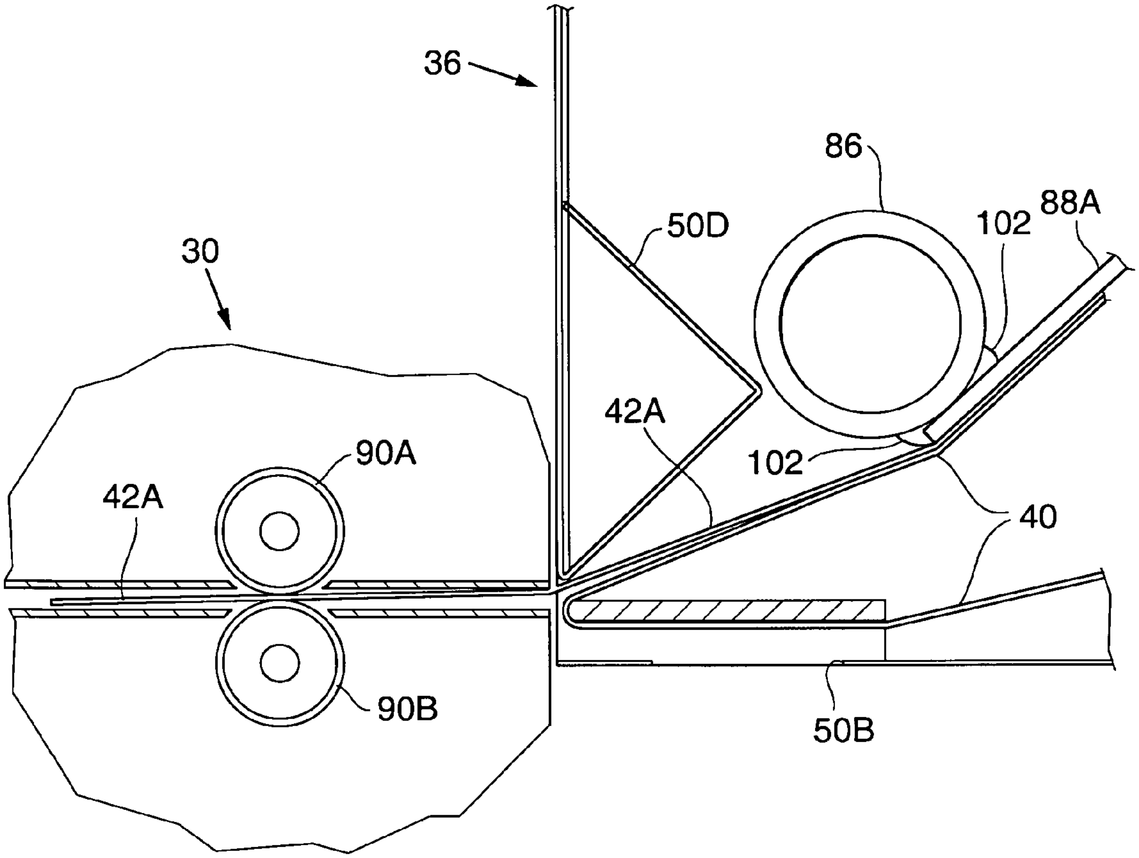
FIG. 24 is a cut away view showing a binder strip being ejected from the second embodiment binder strip cassette into a binding machine.

FIG. 20 is an expanded view of the region of the binder strip roll 38 of FIG. 19 where the roll is unwound. As can be seen, the outer edge of the thin contact member 88C is disposed near the point where the binder strips 42 and overlying carrier 40 separate from the roll 38. The bent member 88B of the primary guide 88 is captured between the wound portion of the roll 38 and a short segment of the unwound portion of the roll. The force applied by the unrolled portion gently forces the bent portion 88B and the thin plastic contact member 88C against the smooth surface of the carrier 40 still wound on the roll. The unwound portion of the roll passes over the outer surface 100 of the bent member 88B (FIG. 22) and of main member 88A of the primary guide 88 thereby directing the unwound portion along the non-linear path 98 shown in FIG. 21. The thin contact member 88C insures that the primary guide 88 does not catch on the ends of the binder strips 42 passing over the primary guide. This action causes the binder strips 42 passing over surface 100 to be forced against the overlying carrier 40 thereby permitting the carrier to carry out the desired function of transporting the binder strips out of the cassette as shown in FIG. 24. Note that FIG. 24 also shows the cassette 36 positioned adjacent a binding machine 30 (the cassette holding apparatus 58 is not shown) feeding a strip into a pair of pinch rollers 90A, 90B of the binding machine. The pinch rollers function to draw the binder strip 42A into the binding machine.

Figure 25B:
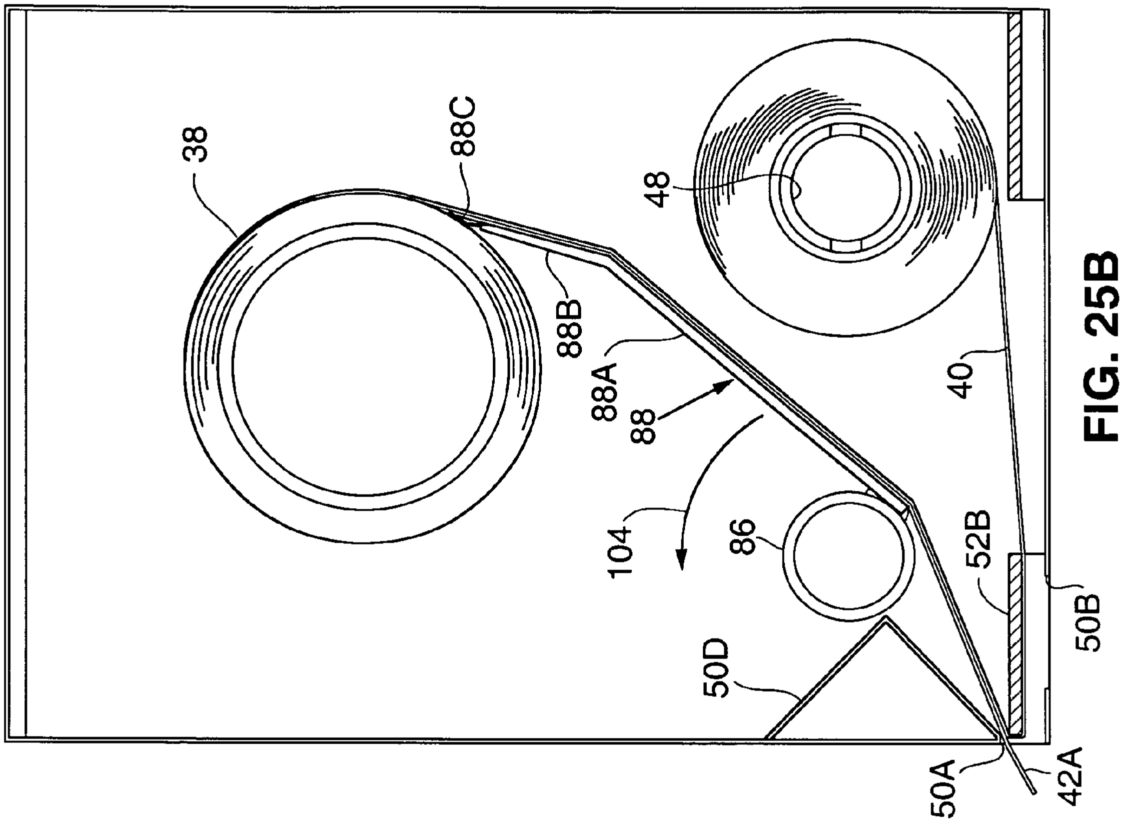
FIGS. 25A and 25B are cut away views of the second embodiment binder strip cassettes illustrating the pivoting of the binder strip primary guide as the binder strip roll is depleted.
Figure 25A:
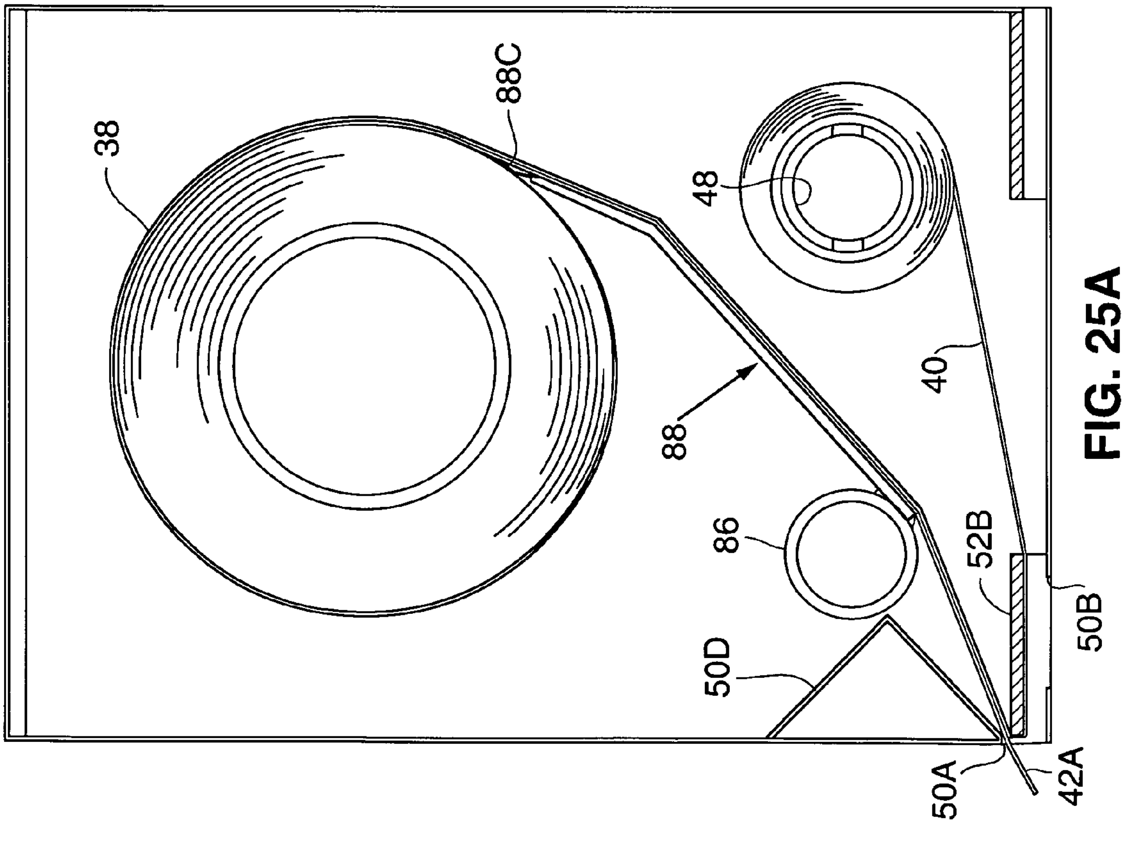

The geometry of the primary guide 88 and the location of the pivot mount 86 relative to the binder strip roll 38 will vary depending upon various factors, including the desired amount of non-linearity of the path 98 (FIG. 21). If the non-linearity is too great, the resultant friction will cause the drive force applied to the take up roller 48 to be excessive. The geometry should also be selected to ensure that the contact member 88C can engage the roll 38 even when the roll is substantially completely unwound. This is illustrated in FIGS. 25A and 25B. In FIG. 25A, the roll 38 is substantially full, with contact member 88C contacting the roll as shown. In FIG. 25B, the roll is substantially depleted thereby causing the captured primary guide 88 to pivot about the center of pivot mount 86 in the direction shown by arrow 104 so that the contact member 88C continues to engage the roll.

Figure 28:
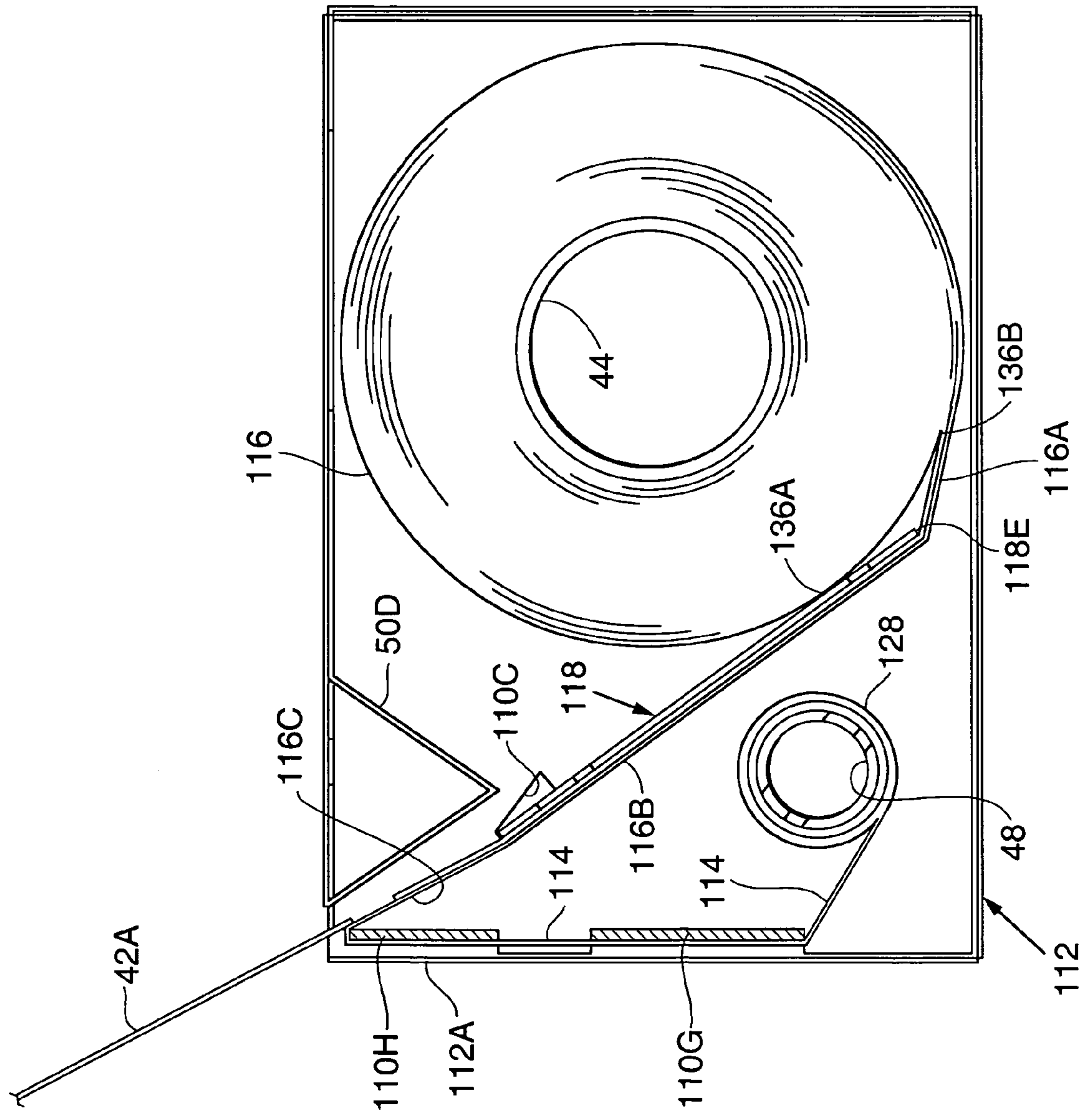
FIG. 28 is an elevational view side view of a binder strip cassette in accordance with a third embodiment of the present invention.
Figure 29:
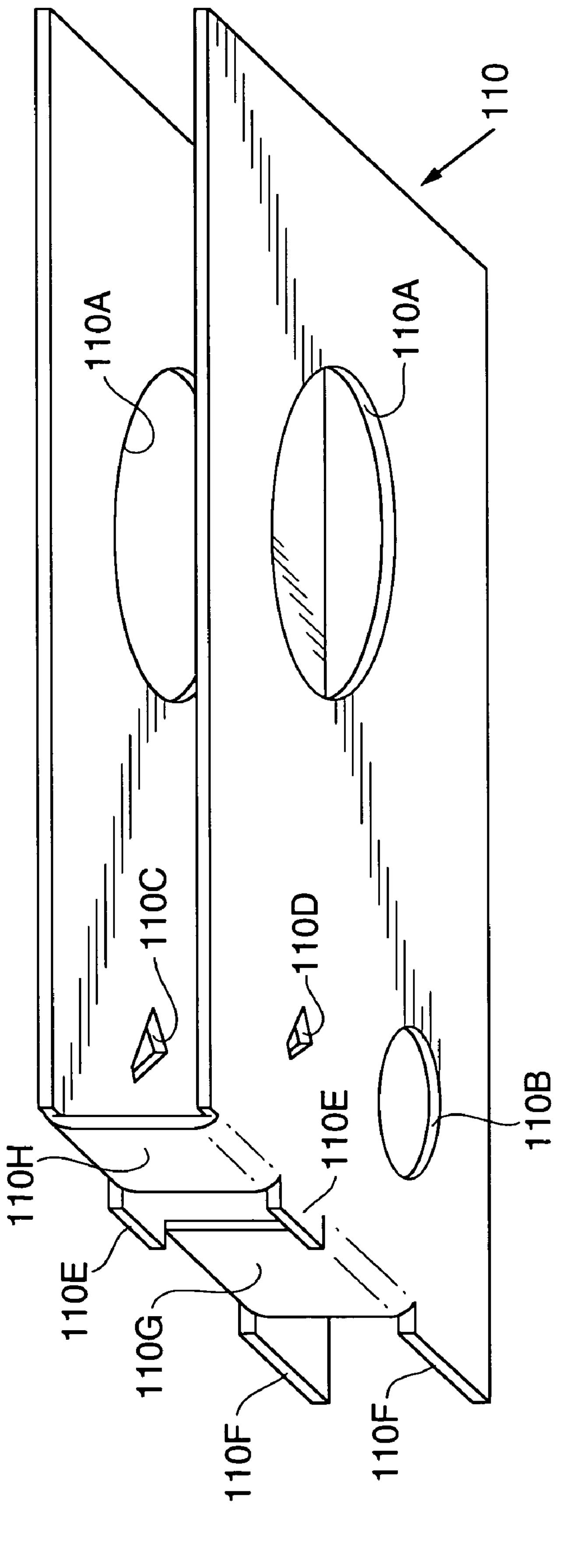
FIG. 29 is a perspective view of the internal frame member of the third embodiment binder strip cassette.
Figure 30:
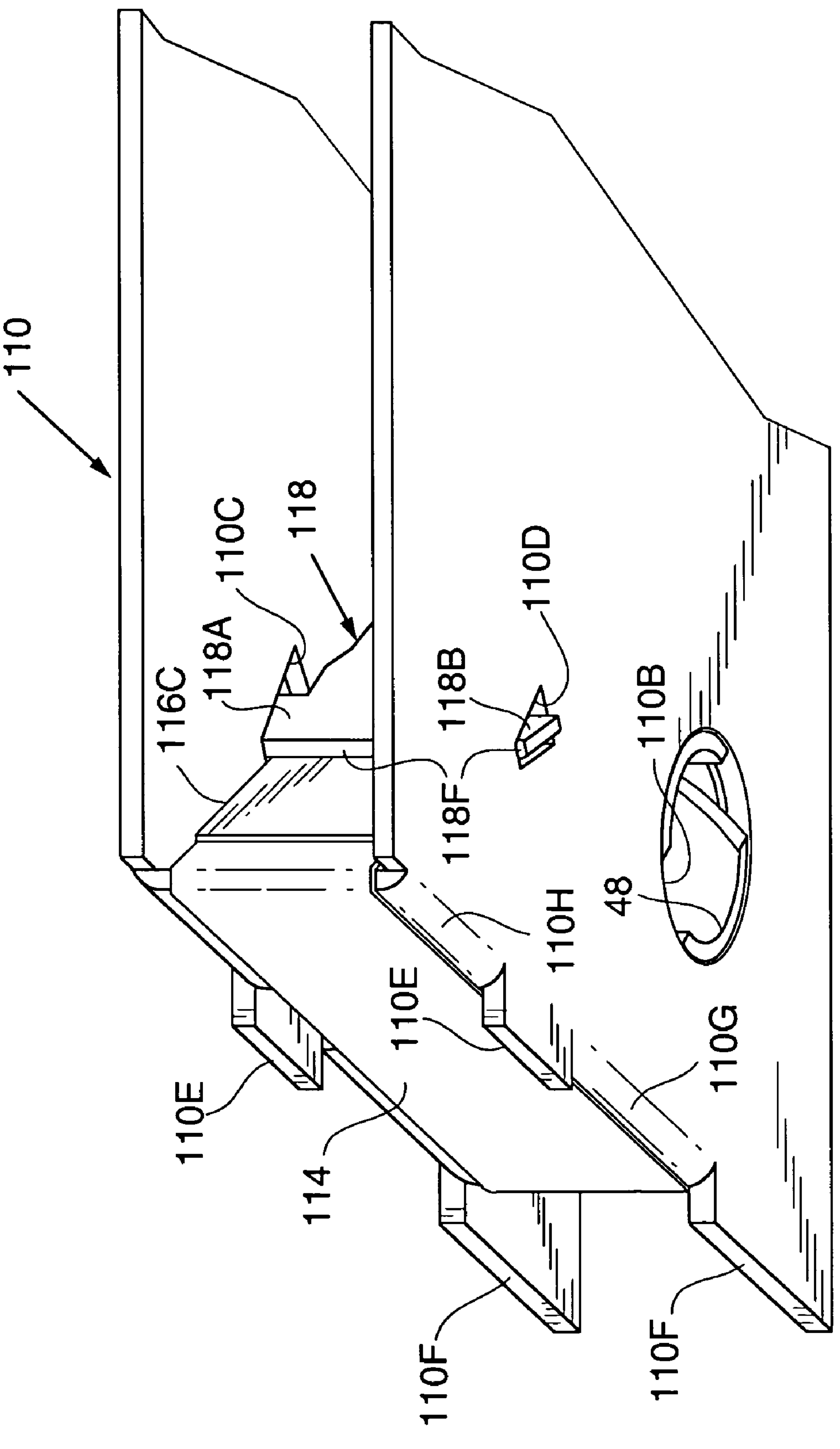
FIG. 30 is an expanded view of FIG. 29 showing details of the elongated carrier passing over the frame web members.

A third embodiment binder strip cassette is shown in FIG. 28, with this embodiment eliminating the need for an adhesive to secure the binder strip to the carrier. The cassette is similar to the previously-described cassettes in that it is preferably made exclusively of recyclable materials, primarily paper. The cassette includes an inner frame member 110 as shown in FIGS. 29 and 30, typically made of corrugated cardboard. The frame member 110 is encased in a cardboard outer case 112, similar to the previously described case 50 of FIG. 4. The cassette also includes a binder strip roll 116 mounted on a cardboard main roller 44 for rotation. Roller 44 is mounted in the two frame openings 110A formed in frame member 110, with the roller being captured in the openings by the inward force applied to the sidewalls (not designated) of the outer cardboard casing 112.

As will be explained in greater detail, the binder strip roll 116 utilizes a special elongated carrier 114 which has flap members for supporting the conventional binder strips mounted on the carrier. A pivotably mounted guide member 118 functions to separate an unwound portion 116A of the binder strip roll 116 from the roll and to guide the unwound portion to a binder strip ejection opening (not designated), similar to opening 50A shown in the FIG. 4 embodiment. The carrier 114 is pulled around a sharp bend formed by frame web member 110H of the frame member 110 (FIGS. 29 and 30), with the more rigid binder strip 42A tending to resist so that it separates from the carrier and extends through the eject opening in the housing.

As can best be seen in FIG. 29, frame member 110 is formed from a flat sheet of cardboard which is folded in the form of a U. The side portions of the U each include an opening 110A for securing the main roller 44 as previously noted and each include a smaller opening 110B for receiving the smaller take up roller 48. The intermediate portion of the frame member U connecting the parallel side portions includes two spaced apart web members which secure the side members together, including previously noted web member 110H, having an edge that forms the sharp bend over which the carrier 114 passes and web member 110G. A pair of frame extensions 110E are disposed intermediate web members 110H and 110G which extend away from the frame to engage the interior surface of outer case 112. A similar pair of frame extensions 110F are disposed below web member 110G which also extend away from the frame to engage the outer case 112. Thus, the two pair of frame extensions 110F and 110E form a narrow space between the frame and the outer case 112 to permit the passage of carrier 114 as the carrier is pulled over the bending edge of web member 110H, over the web member 110H itself and the over web member 110G and back into the interior of the frame member to be taken up by roller 48. As was the case for the previously-described cassette embodiments, take up roller 48 is rotationally driven by the drive mechanism, such as the mechanism of the cassette holding apparatus 58 as shown in FIGS. 16A and 16B, in order to feed the binder strips into an associated binding machine.

Figure 31A:
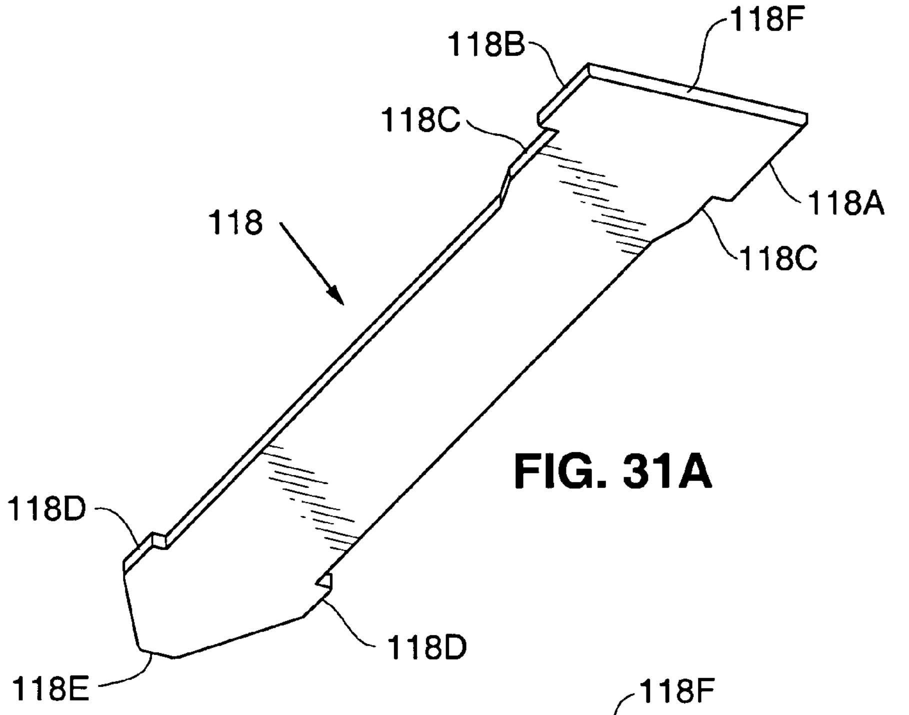
FIGS. 31A, B and C are respective perspective, elevational and plan views of the third embodiment cassette pivoting guide member.
Figure 31B:
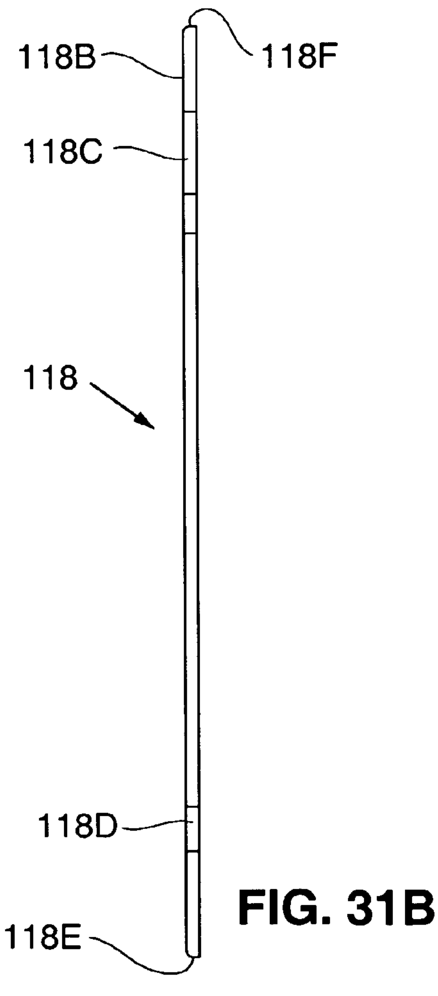
Figure 31C:
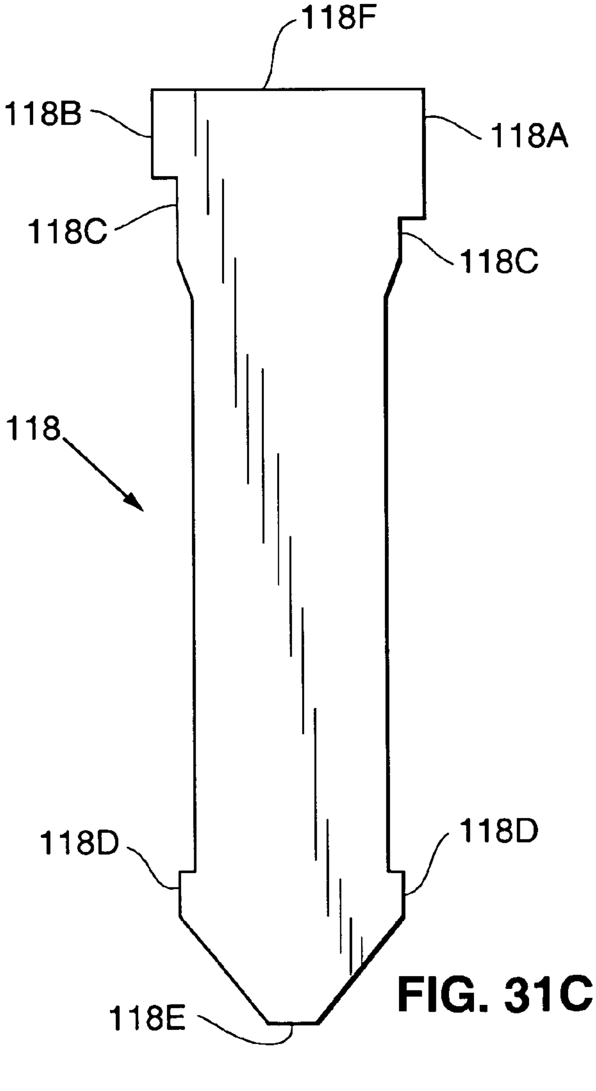

Frame openings 110C and 110D function to secure the pivoting guide member 118, with the quadrilateral shape of the openings permitting the guide member to pivot. Details of the guide member are shown in FIGS. 31A, 31B and 31C. The guide member 118, which is preferably made of chipboard or other relatively rigid recyclable material, includes a pair of opposing extensions 118A and 118B which are received by the respective openings 110C and 110D in the frame member 110. Extension 118A is longer than 118B so that the longer extension will not fit within the smaller opening 110D to avoid incorrect assembly. The spacing between the outer edges of extensions 118A and 118B is sufficiently large to ensure that the extensions remain captured in the respective openings 110C and 110D but not so large that that they are forced against the respective interior surfaces of the outer case 112 in which the frame member 110 is disposed. As can best be seen in FIG. 30, the securing end 118F of the guide member 118 is positioned in the narrow portion of the respective quadrilateral openings 110C and 110D so that member 118 can pivot at end 118F, with the wide portion of the openings providing the needed width for movement of that portion of the extensions 118A and 118B displaced from end 118F as the guide member 118 pivots.

Figure 37:
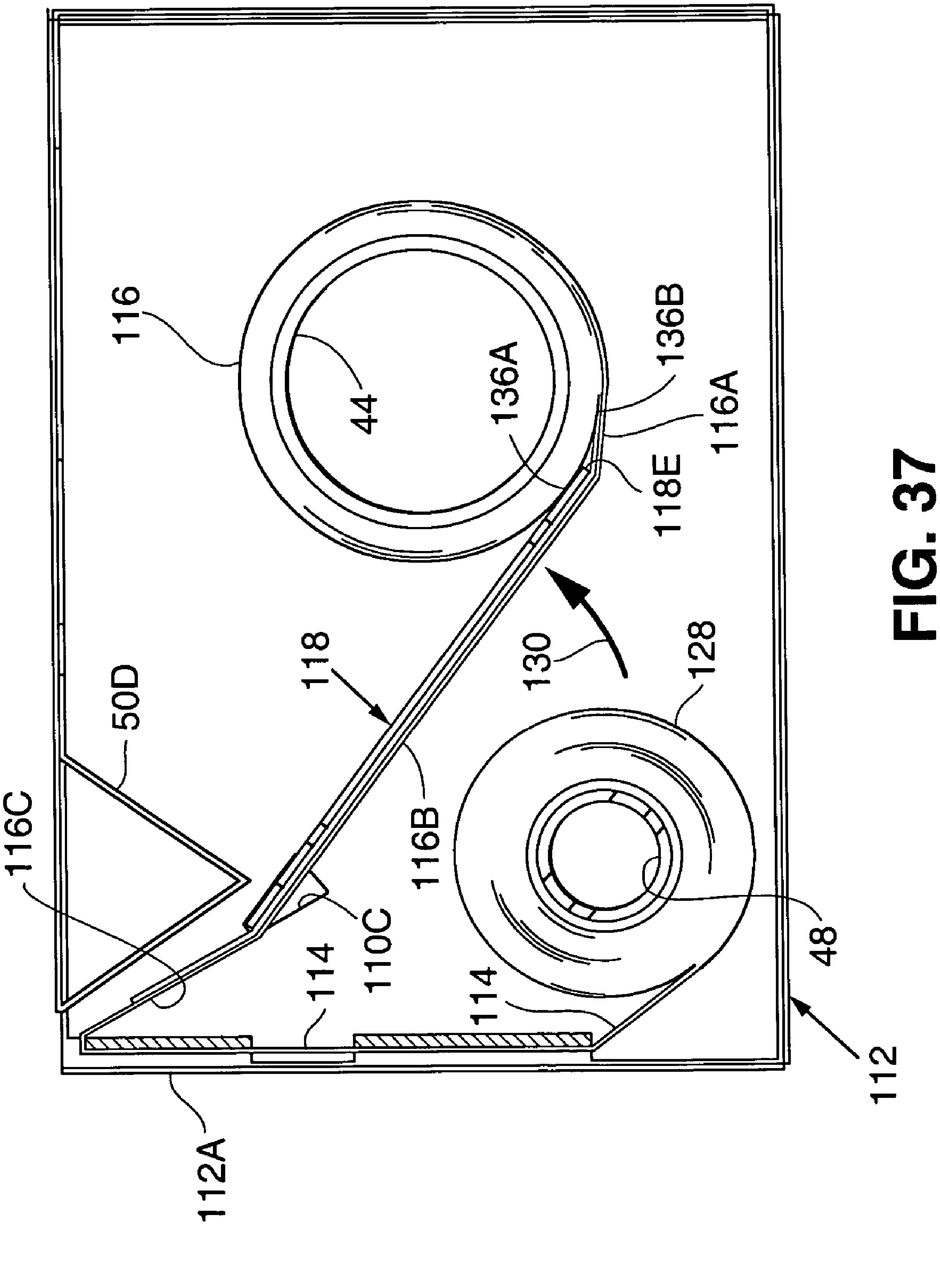
FIG. 37 is an elevational view side view of the third embodiment binder strip cassette showing the binder strip roll substantially depleted.

Guide member 118 also includes a first pair of opposing shoulders 118C and a second pair of opposing shoulders 118D that lightly engage the respective opposing interior surfaces of the frame member 110 sides thereby maintaining the proper orientation of the guide member between the frame member sides as the guide member pivots. This ensures that the leading tip 118E of the guide member is positioned on the center of the elongated carrier 114 as is desired for reasons noted below. As can best be seen in FIG. 28, the end of the guide member 118, including the leading tip 118E is captured between the binder strip roll 116 and an unwound portion 116A of the binder strip roll. As the binder strip roll 116 is depleted, as shown in FIG. 37, the diameter of the roll decreases thereby causing the guide member 118 to pivot as indicated by arrow 130.

Figure 32:
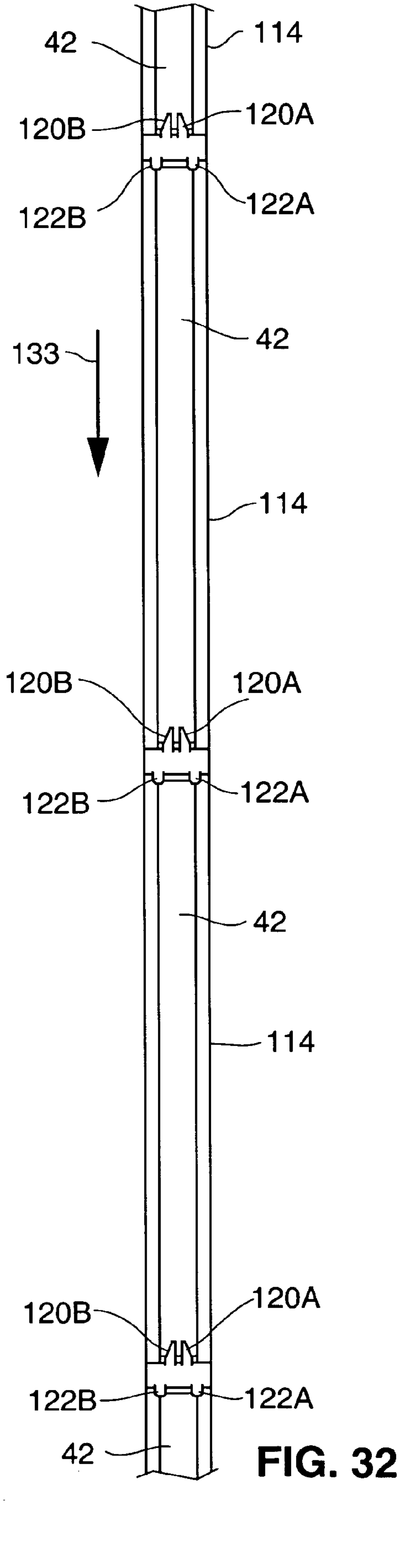
FIG. 32 is a plan view of the on embodiment of an elongated carrier for used in a binder strip cassette showing conventional binder strips mounted on the carrier.
Figure 33:
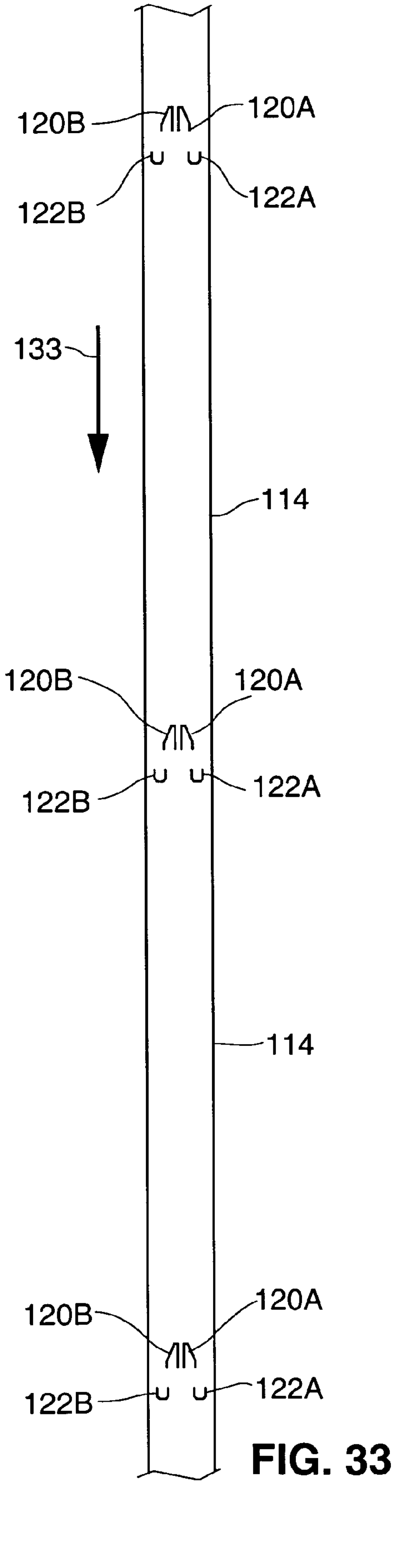
FIG. 33 is a plan view of the elongated carrier of FIG. 32 with the binders strips removed.

FIG. 32 is a plan view of a portion of the modified elongated carrier 114 with binder strips 42 loaded on the carrier. Arrow 133 shows the direction that the carrier is driven when a strip is being ejected from the cassette. FIG. 33 is a plan view of the same section of the modified elongated carrier prior to loading of the carrier with binder strips. The modified carrier 114 includes a pair of spaced apart leading flap members 120A and 120B and a pair of spaced apart trailing flap members 122A and 122B. The spacing between the forward and trailing flap members corresponds generally to the length of the binder strips 42 to be loaded on the carrier. As can be seen in FIG. 33, one embodiment of the modified carrier, the flap members are formed by suitably shaped cutouts made in the carrier at the appropriate locations. A pair of the flap members formed by the cutouts, leading flap members 120A and 120B for example, are folded up and away from the main portion of the carrier so that the leading end of one of the binder strips 42 can be inserted under the flap members so that the binder strip end is positioned between the carrier and the flap member. Next, the adjacent trailing edge flap members 122A and 122B are folded up so the leading end of the binder strip can be placed under those flap members so that the opposite end of the binder strip is disposed intermediate the flap member and the carrier. The leading and trailing flap members are also sometimes referred to herein as respective leading and trailing securing members, with that part of the securing member structure extending over the binder strips forming a cover portion and that part of the structure connecting the cover portion to the carrier 114 forming a hinge portion.

The leading flap members 120A and 120B are positioned in the center of the carrier and are spaced close enough relative to one another so that they both will engage the leading tip 118E of the guide member 118 as will be explained. As noted above, front opposing shoulder members 118D and rear opposing shoulder members 118C function to keep the leading tip 118E accurately positioned over the elongated carrier 114. The location of trailing flap members 122A and 122B and the relative spacing is such that the leading tip 118E of the guide member will pass between the flap members as will also be explained.

Figure 34:
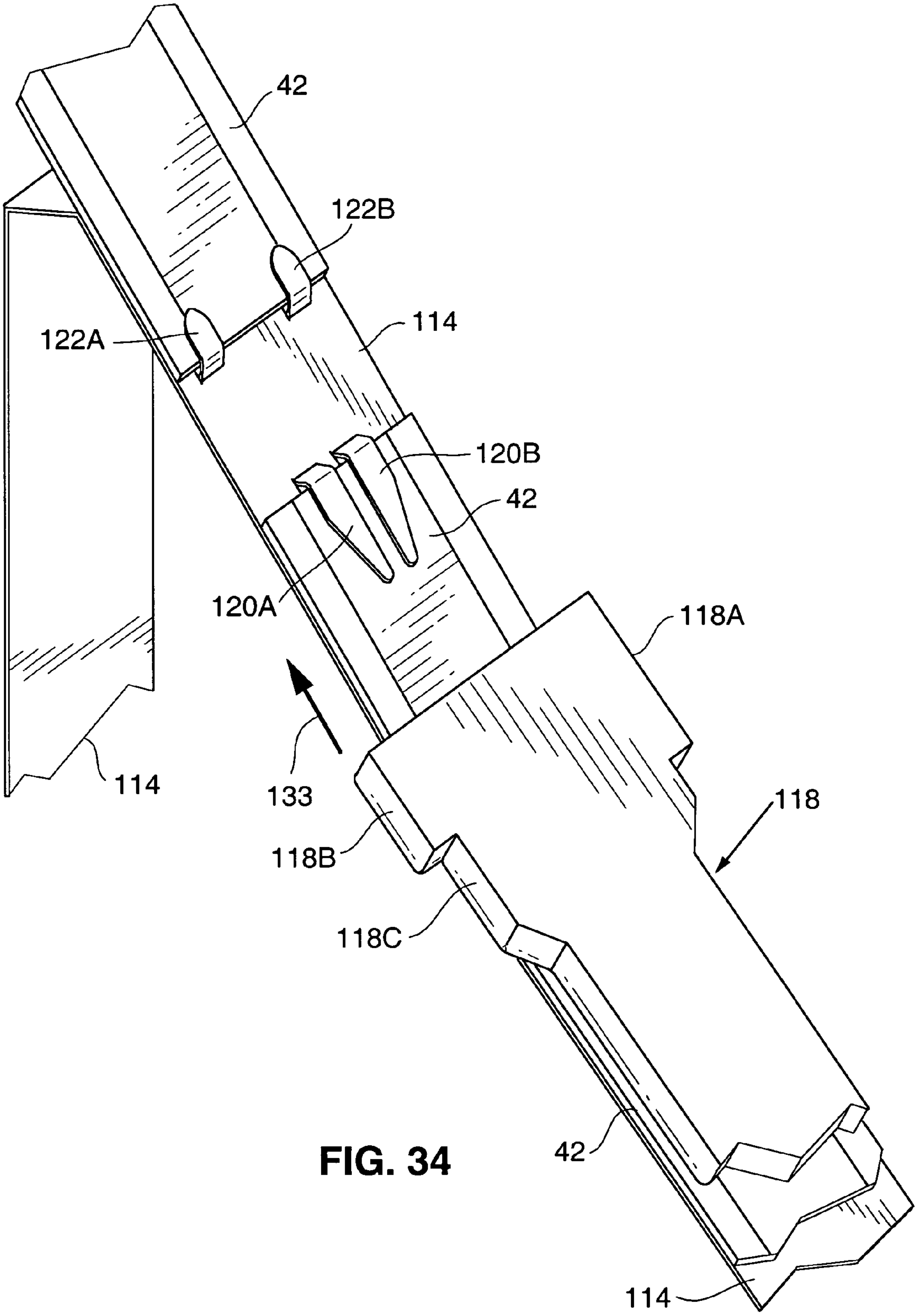
FIG. 34 is a perspective view of the interior in the third embodiment cassette showing the elongated carrier of FIG. 32 as one binder strip is being separated from the carrier.

The binder strips 42 are positioned with the adhesive matrix 20B/20C (FIG. 1) facing away from the carrier 114 and with the binder strip substrate 20 contacting the carrier. The opposing pairs of flap members 120A/120B and 122A/122B secure the intermediate binder strips in position on the carrier so that the strips remain adequately attached to the carrier for delivery of the strip to the exit opening 50A without the use of an adhesive between the strip substrates and the carrier. Further, the flap members also permit the strip to easily be separated from the carrier when the carrier is bent around the edge of web member 110H. This is illustrated in FIG. 34 which shows portions of two binder strips at different stages of being ejected from the cassette. One binder strip is still in the process of being unwound from the binder strip roll 116 roll, with leading flaps 120A/120B shown securing the leading edge of the binder strip. Another binder strip 42 is shown having a leading edge (not depicted) which has already been separated from the leading flap members 120A and 120B when the carrier 114 was previously bent around the web member 110H edge. Trailing edge flap members 122A and 122B of the binder strip continue to provide drive to the binder strip as the strip is being ejected while at the same time releasing the binder strip trailing edge once the strip has begun to be drawn into the associated binding machine by the binding machine loading mechanism as shown in FIG. 18. As previously noted, the binding machine will start to pull the strip into the machine at a rate greater than the strip is being driven by the cassette drive mechanism. Since the trailing flap members 122A/122B will easily release the strip under these conditions, the strip will not tend to pull the carrier 114 at a rate faster than the carrier is being fed thereby avoiding any tendency of the carrier drive mechanism of the cassette to jam.

As shown in FIG. 28, when the binder strip roll 116 is substantially full, the guide 118 contact point 136A on the roll is spaced a substantial distance from the point 136B where the unwound binder strip roll segment 116A becomes separated from the roll due to the presence of the guide member. As the roll 116 becomes more depleted as shown in FIG. 37, point 136A moves closer to point 136B. During this entire process, the guide member 118 remains captured between the roll 116 and the unwound portions 116A/116B of the roll and the guide member pivots towards the roll as indicated by arrow 130 of FIG. 37.

Figure 35:
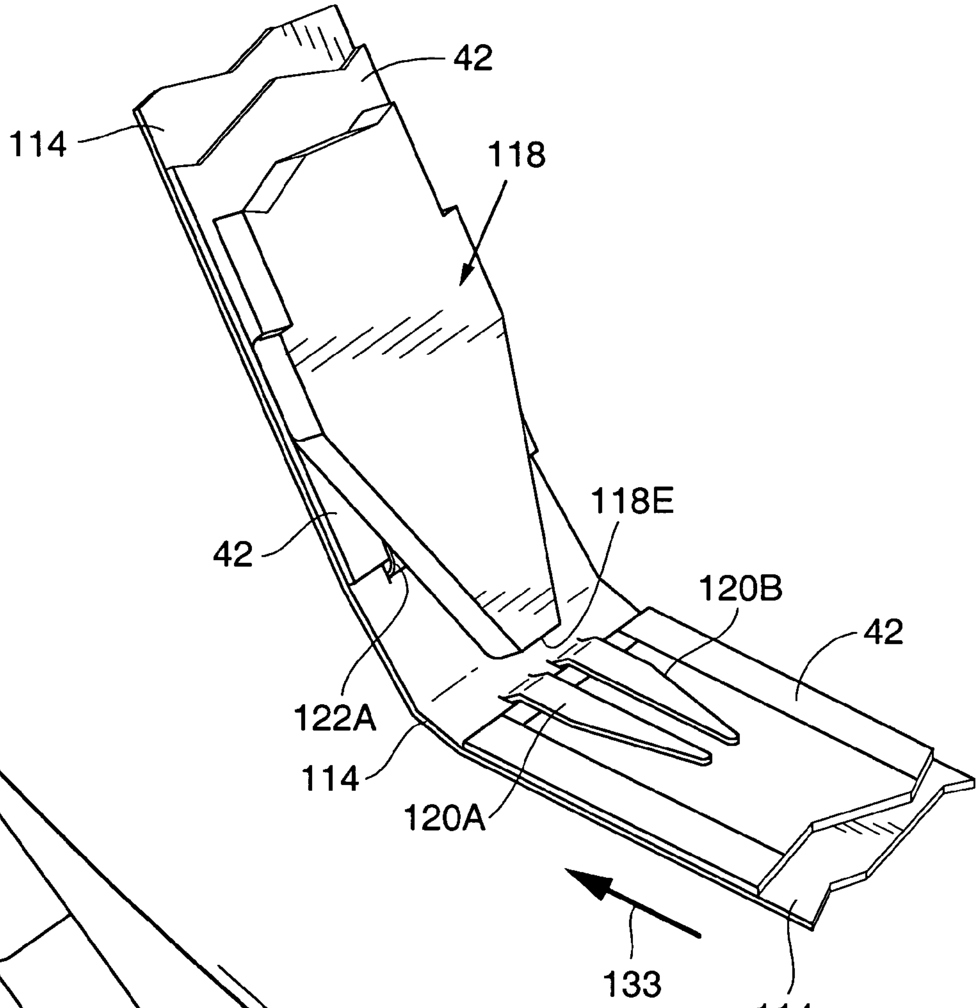
FIG. 35 is an enlarged perspective view of the third embodiment cassette showing the leading end of the pivoting guide apparatus as the apparatus is unwinding part of the binder strip roll.
Figure 36:
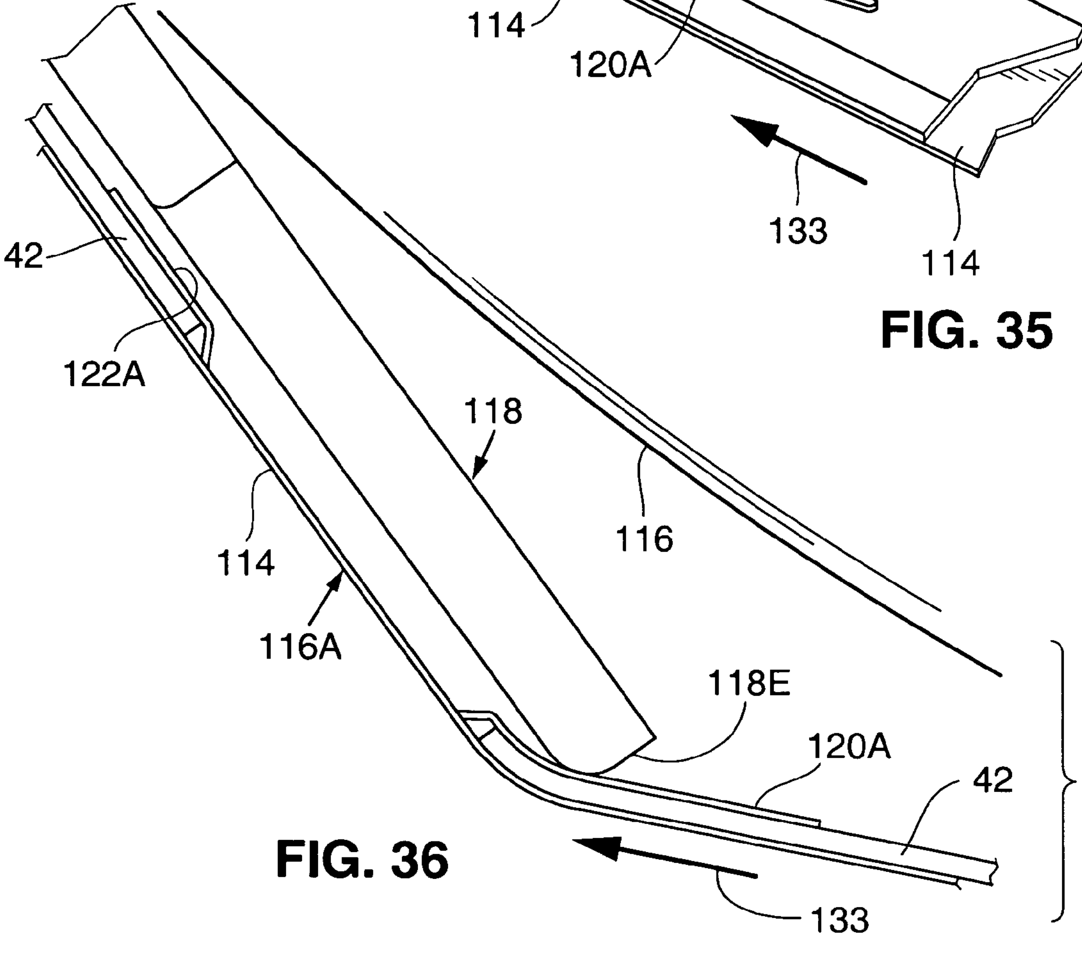
FIG. 36 is an enlarged elevational view of the pivoting guide apparatus of the third embodiment cassette as the guide apparatus continues to unwind the binder strip roll.

FIGS. 35 and 36 are enlarged views showing the manner in which the leading tip 118E of the guide member 118 engages the leading flap members 120A and 120B and rides up over the flap members onto the surface of the binder strip 42. As the binder strip 42 is driven further by the elongated carrier, the binder strip will be drawn under the leading tip 118E of the guide member until the tip 118E passes between the trailing flap members 122A, over the trailing edge of the binder strip and back on the carrier until the next binder strip comes along. By staying centered on the leading flap members 120A and 120*b*, tip 118E will avoid colliding with the leading edge of the binder strip and by passing between the flap members 122A and 122B, the leading tip 118E of the guide member will avoid getting caught on the flap members. Thus, it can be seen that accurate positioning of the guide member 118 relative to the elongated carrier 114 is important.

Note that the wound binder strip roll 116 will include locations where the carrier 114 supporting one binder strip will be contacting the heat-activated adhesive disposed on another binder strip in the roll. This heat activated adhesive can be slightly tacky, particularly if the cassette has been exposed to elevated ambient temperatures. The openings in the carrier 114 left by the carrier portions used to form the flap members 120A/120B and 122A/122B will permit portions of this potentially tacky adhesive of the overlying binder strip to contact and adhere to the substrate of the underlying binder strip. In order to minimize such undesirable adhesion, the total area of such carrier openings is reduced by separating the flap members into two small members, such as separate leading flap members 120A and 120B, rather than a single larger leading member. Note also that outer casing modified elongated carrier 114 can be provided with various types of indicia as previously described, for example, in connection with FIGS. 10A, 10B, 10C, 26 and 27. Such indicia can be read by equipment external to the outer casing by way of an opening in the casing similar to opening 50B previously described in connection with FIGS. 10A, 10B and 10C.

Figure 38:
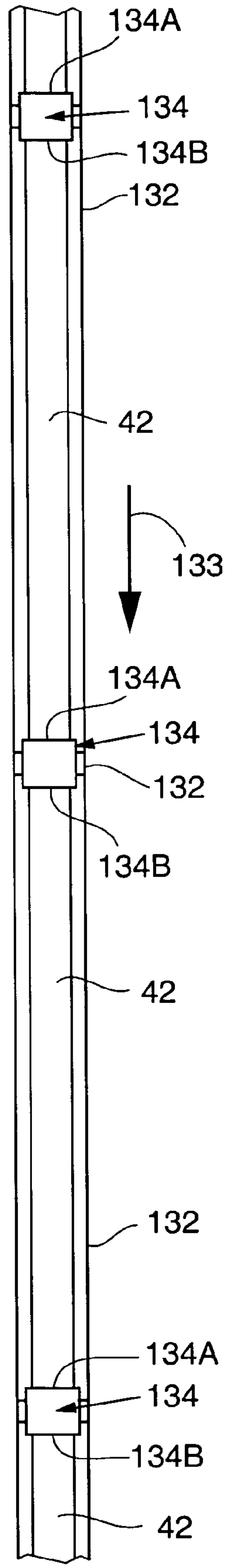
FIG. 38 is a plan view of a further alternative elongated carrier showing binder strips attached to the carrier.
Figure 39:
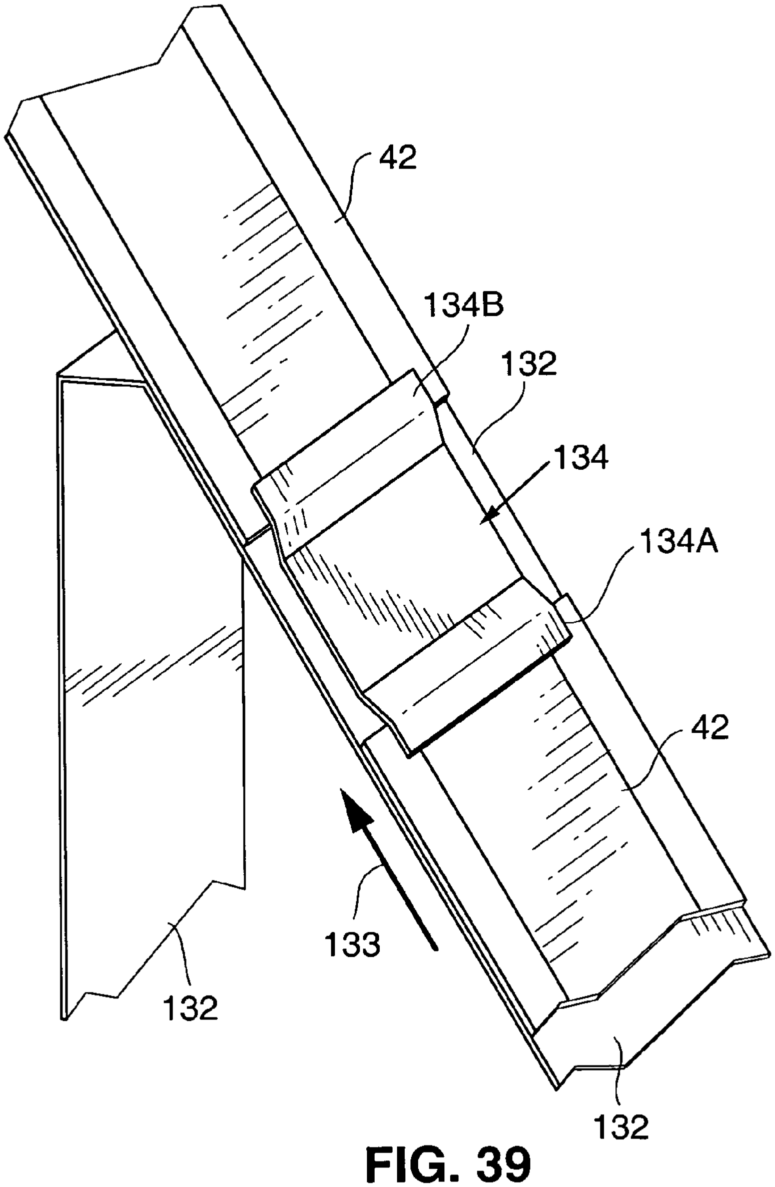
FIG. 39 is a perspective view of the interior in the third embodiment cassette showing the elongated carrier of FIG. 38 as one binder strip is being separated from the carrier.

Although the preferred embodiment elongated carrier 114 includes flap members formed from the carrier itself, a second embodiment carrier 132 shown in FIGS. 38 and 39 could be used. Carrier 132 includes a plurality of spaced apart flap attachments 134 that are secured to the elongated carrier body. The rectangular shaped flap attachments 134 include outer portions at opposite ends that form the leading flap member 134A and the trailing flap member 134B and a central portion that is secured to the carrier body by way of adhesive. As shown in FIG. 38, the flap attachments are attached on the carrier is distance in accordance with the length of the binder strips 42 to be attached so that leading flap members 134A will secure the leading end of the binder strips 42 and the trailing flap member 134B will secure the trailing end of the binder strips. Leading single piece flap member 134A provides the same function as the previously described separate leading flap members 120A/B and the trailing single piece flap member 134B provides the same function as the previously described separate trailing 122A/B flap members. The trailing flap member 134B can be separated into two spaced apart flap members to provide a path intermediate the flap members for the leading tip 118E of the guide member 118 to pass.

Thus, various embodiments of a binder strip cassette have been disclosed. Although these embodiments have been described in some detail, it is to be understood that various changes can be made by those skilled in the art without departing from the spirit and scope of the present invention as defined by the appended claims.

The invention claimed is:

1. A binder strip cassette comprising:

a cassette housing;

a multiplicity of elongated binder strips, each of said binder strips including a flexible substrate and a heat-activated adhesive disposed on the substrate;

a flexible elongated carrier supporting said binder strips, with said binder strips being disposed along a length of the elongated carrier in an end-to-end arrangement and with each binder strip having a leading end and a trailing end, with the leading end of each binder strip being secured to the elongated carrier by a leading securing member so that the leading ends of the binder strips are disposed intermediate the leading securing member and the elongated carrier and with the trailing end of each binder strip being secured to the elongated carrier by a trailing securing member so that the trailing ends of the binder strips are disposed intermediate the trailing securing member and the elongated carrier and with said binder strips and supporting elongated carrier being wound to form a binder strip roll;

a mounting mechanism which rotatably mounts the binder strip roll within the cassette housing;

a drive apparatus for unwinding the binder strip roll to provide an unwound portion of the binder strip roll;

a separating apparatus disposed within the cassette housing for separating the binder strips from the elongated carrier of the unwound portion of the binder strip roll to produce a separated binder strip, with the unwinding by the drive apparatus causing the separated binder strip to be at least partially ejected through a binder strip eject opening in the cassette housing, with the leading end of the separated binder strip being ejected first.

2. The binder strip cassette of claim 1 wherein the leading securing member includes a first section cut from the elongated carrier, with the first section including a first cover portion that extends over the leading end of the binder strip and a first hinge portion that connects the first cover portion to the elongated carrier.

3. The binder strip cassette of claim 2 wherein the leading securing member includes a second section, displaced from the first section, said second section cut from the elongated carrier, with the second section including a second cover portion that extends over the leading end of the binder strip and a second hinge portion that connects the second cover portion to the elongated carrier.

4. The binder strip cassette of claim 2 wherein the trailing securing member includes a first section cut from the elongated carrier, with the first section including a first cover portion that extends over the trailing end of the binder strip and a first hinge portion that connects the first cover portion to the elongated carrier.

5. The binder strip cassette of claim 4 wherein the trailing securing member includes a second section, displaced from the first section, said second section cut from the elongated carrier, with the second section including a second cover portion that extends over the trailing end of the binder strip and a second hinge portion that connects the second cover portion to the elongated carrier.

6. The binder strip cassette of claim 1 further including a combined securing member disposed between adjacent ones of the multiplicity of binder strips, with each combined securing member including a central section adhered to the elongated carrier, a first outer section that includes the trailing securing member for one of the adjacent binder strips and a second outer section that includes the leading securing member for another of the adjacent binder strips.

7. A binder strip roll for use in a binder strip cassette, said binder strip roll including:

a multiplicity of elongated binder strips, each of said binder strips including a flexible substrate and a heat-activated adhesive disposed on the substrate;

a flexible elongated carrier supporting said binder strips, with said binder strips being disposed along a length of the elongated carrier in an end-to-end arrangement with the adhesive facing away from the carrier and with each binder strip having opposite leading and trailing ends, with the leading end of each binder strip being secured to the elongated carrier by a leading securing member so that the leading ends of the binder strips are disposed intermediate the leading securing member and the elongated carrier and with the trailing end of each binder strip being secured to the elongated carrier by a trailing securing member so that the trailing ends of the binder strips are disposed intermediate the trailing securing member and the elongated carrier and with said binder strips and supporting elongated carrier being wound to form the binder strip roll.

8. The binder strip roll of claim 7 wherein the leading securing member includes a first section cut from the elongated carrier, with the first section including a first cover portion that extends over the leading end of the binder strip and a first hinge portion that connects the first cover portion to the elongated carrier.

9. The binder strip roll of claim 8 wherein the leading securing member includes a second section, displaced from the first section, said second section cut from the elongated carrier, with the second section including a second cover portion that extends over the leading end of the binder strip and a second hinge portion that connects the second cover portion to the elongated carrier.

10. The binder strip roll of claim 8 wherein the trailing securing member includes a first section cut from the elongated carrier, with the first section including a first cover portion that extends over the trailing end of the binder strip and a first hinge portion that connects the first cover portion to the elongated carrier.

11. The binder strip roll of claim 10 wherein the trailing securing member includes a second section, displaced from the first section, said second section cut from the elongated carrier, with the second section including a second cover portion that extends over the trailing end of the binder strip and a second hinge portion that connects the second cover portion to the elongated carrier.

12. The binder strip roll of claim 7 further including a combined securing member disposed between adjacent ones of the multiplicity of binder strips, with each combined securing member including a central section adhered to the elongated carrier, a first outer section that includes the trailing securing member for one of the adjacent binder strips and a second outer section that includes the leading securing member for another of the adjacent binder strips.

13. A binder strip roll for use in a binder strip cassette, said binder strip roll including:

a multiplicity of elongated binder strips, each of said binder strips including a flexible substrate and a heat-activated adhesive disposed on the substrate;

a flexible elongated carrier supporting said binder strips, with said binder strips being disposed along a length of the elongated carrier in an end-to-end arrangement and with each binder strip having opposite leading and trailing ends, with the leading end of each binder strip being secured to the elongated carrier by a leading securing member so that the leading ends of the binder strips are disposed intermediate the leading securing member and the elongated carrier and with the trailing end of each binder strip being secured to the elongated carrier by a trailing securing member so that the trailing ends of the binder strips are disposed intermediate the trailing securing member and the elongated carrier and with said binder strips and supporting elongated carrier being wound to form the binder strip roll and wherein the leading securing member includes a first section cut from the elongated carrier, with the first section including a first cover portion that extends over the leading end of the binder strip and a first hinge portion that connects the first cover portion to the elongated carrier.

14. A binder strip roll for use in a binder strip cassette, said binder strip roll including:

a multiplicity of elongated binder strips, each of said binder strips including a flexible substrate and a heat-activated adhesive disposed on the substrate;

a flexible elongated carrier supporting said binder strips, with said binder strips being disposed along a length of the elongated carrier in an end-to-end arrangement and with each binder strip having opposite leading and trailing ends, with the leading end of each binder strip being secured to the elongated carrier by a leading securing member so that the leading ends of the binder strips are disposed intermediate the leading securing member and the elongated carrier and with the trailing end of each binder strip being secured to the elongated carrier by a trailing securing member so that the trailing ends of the binder strips are disposed intermediate the trailing securing member and the elongated carrier and with said binder strips and supporting elongated carrier being wound to form the binder strip roll and with the binder strip roll further including a combined securing member disposed between adjacent ones of the multiplicity of binder strips, with each combined securing member including a central section adhered to the elongated carrier, a first outer section that includes the trailing securing member for one of the adjacent binder strips and a second outer section that includes the leading securing member for another of the adjacent binder strips.

* * * * *